United States Patent [19]

Aoki et al.

[11] Patent Number: 4,810,062
[45] Date of Patent: Mar. 7, 1989

[54] LIQUID CRYSTAL CELL WITH OPAQUE MASK FOR PRINTING DEVICE

[75] Inventors: Kenji Aoki; Mitsuo Nagata; Haruo Nakamura; Teiji Miura, all of Suwa, Japan

[73] Assignee: Seiko Epson Corporation, Tokyo, Japan

[21] Appl. No.: 136,426

[22] Filed: Dec. 16, 1987

Related U.S. Application Data

[63] Continuation of Ser. No. 865,638, May 15, 1986, abandoned, which is a continuation of Ser. No. 523,997, Aug. 17, 1983, abandoned, which is a continuation of Ser. No. 309,521, Oct. 7, 1981, abandoned.

[30] Foreign Application Priority Data

Oct. 8, 1980 [JP] Japan ................. 55-141085
Jun. 19, 1981 [JP] Japan ................. 56-95091

[51] Int. Cl.$^4$ ............... G02F 1//331; G03B 21/22
[52] U.S. Cl. ............... 350/339 F; 350/331 R; 350/336; 355/71
[58] Field of Search ........... 350/339 F, 338, 331 R; 353/71

[56] References Cited

U.S. PATENT DOCUMENTS

| | | | |
|---|---|---|---|
| Re. 29,684 | 6/1978 | Gordon | 350/331 R |
| 3,622,226 | 11/1971 | Matthies | 350/334 |
| 3,674,338 | 7/1972 | Cartmell et al. | 350/331 R |
| 3,722,998 | 3/1973 | Morse | 355/71 |
| 3,744,878 | 7/1973 | Kiemle et al. | 350/334 |
| 3,778,149 | 12/1973 | Fields | 350/342 X |
| 3,814,501 | 6/1974 | Schindler | 350/338 |
| 3,832,034 | 8/1974 | Edmonds | 350/339 F |
| 3,840,695 | 10/1974 | Fischer | 350/339 F |
| 3,881,809 | 5/1975 | Fergason | 350/338 |
| 3,936,172 | 2/1976 | McVeigh | 350/331 R |
| 3,989,353 | 11/1976 | Phalan | 350/336 |
| 4,006,968 | 2/1977 | Ernstoff et al. | 350/339 F |
| 4,009,934 | 3/1977 | Goodwin et al. | 350/346 |
| 4,023,890 | 5/1977 | Shirasu | 350/336 |
| 4,097,131 | 6/1978 | Nishiyama | 350/339 R X |
| 4,105,288 | 8/1978 | Geffcken et al. | 350/336 |
| 4,219,256 | 8/1980 | Gray et al. | 350/346 |
| 4,235,526 | 11/1980 | Berman et al. | 350/344 |
| 4,236,155 | 11/1980 | Nagata | 350/346 X |
| 4,248,517 | 2/1981 | Nishikawa | 355/71 X |
| 4,278,328 | 7/1981 | Mukoh et al. | 350/349 |
| 4,297,022 | 10/1981 | Lester . | |
| 4,310,858 | 1/1982 | Hareng et al. | 350/350 S X |
| 4,378,956 | 4/1983 | Lester . | |
| 4,383,738 | 5/1983 | Funada et al. | 350/349 |
| 4,386,836 | 6/1983 | Aoki et al. | 350/346 X |
| 4,392,719 | 7/1983 | Sekimoto | 350/342 |
| 4,393,390 | 7/1973 | Aoki | 346/155 |
| 4,482,215 | 11/1984 | Sprague et al. | 350/356 |

FOREIGN PATENT DOCUMENTS 1336254 11/1973 United Kingdom ............... 350/334

OTHER PUBLICATIONS

Castellano, "Now that the Heat is Off Liquid Crystals can Show their Color Everywhere" Electronics, Jul. 6, 1970, pp. 64–70.

Ishibashi et al., "1980 Biennial Display Research Conference on the Multiplexing of the Phase Change Type Color LCD" 1980 IEEE, pp. 186–188.

*Primary Examiner*—Stanley D. Miller
*Assistant Examiner*—David Lewis
*Attorney, Agent, or Firm*—Blum Kaplan

[57] ABSTRACT

A high-speed responsive liquid crystal optical device with improved light transmissivity is provided. The device includes a liquid crystal panel including an optically active liquid crystal material having dielectric anisotropy which becomes zero at a crossing frequency ("fc") of 100 KHz or below. The dielectric anisotropy of the liquid crystal is positive at frequencies lower than fc ("fl") and negative at frequencies higher than fc ("fh"). Crossed polarizers are disposed on each side of the liquid crystal panel. A liquid crystal driving circuit selectively applies a signal of a frequency fh to open the device and a signal of a frequency fl to close the device.

The optical device is particularly well suited for use as a light valve in a printer device. Response time within 1 m sec. permits a printing speed of 10 prints of A4 size to be produced per minute with a resolving power of about 10 dots per 1 m/m. This amounts to a printing speed of approximately 500 lines in one second with each line being written into m sec. or less. The optically active nematic liquid crystal is a composition comprising a optically inactive nematic liquid crystal and an optically active liquid crystal material added thereto.

12 Claims, 37 Drawing Sheets

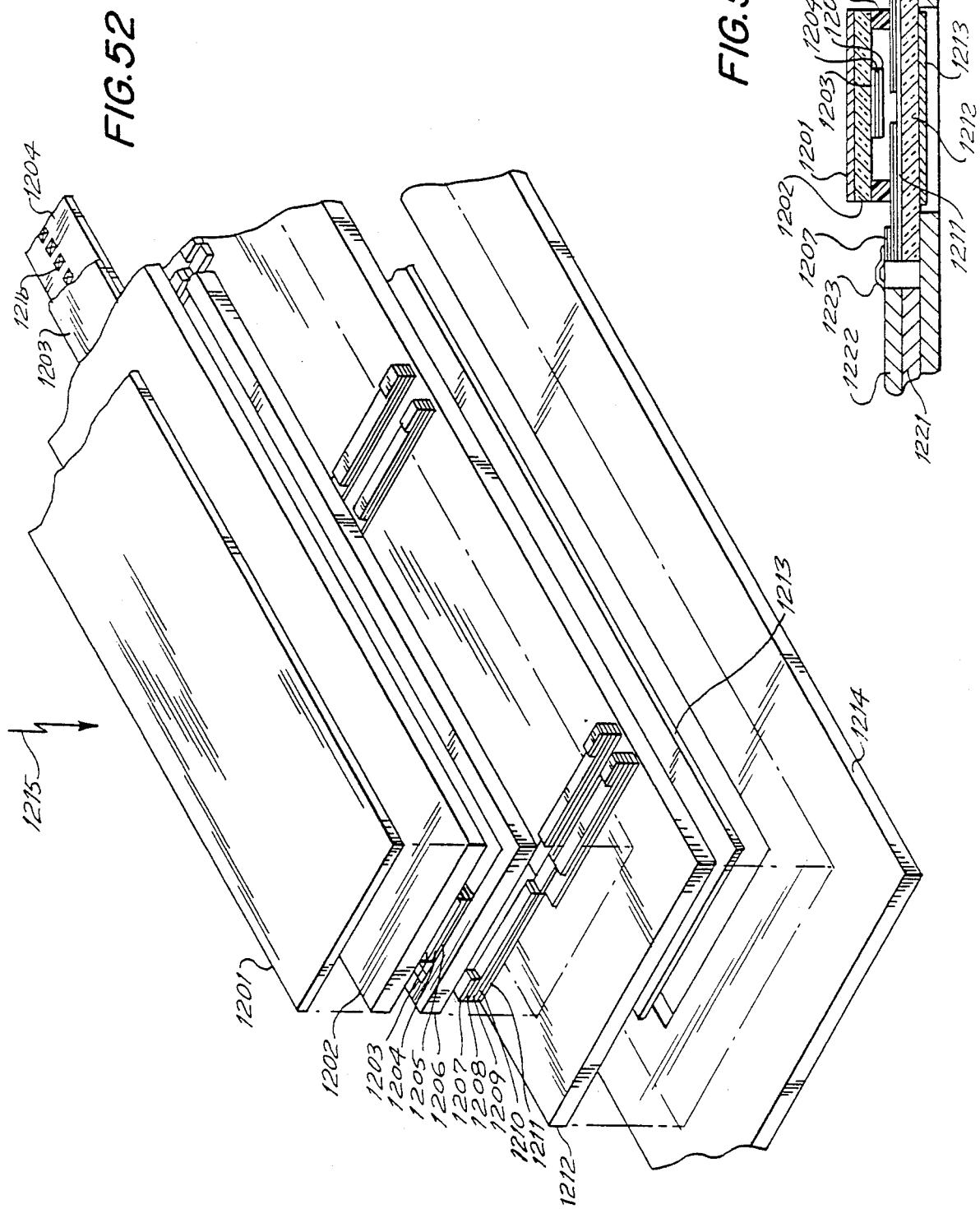

LIQUID CRYSTAL CELL WITH OPAQUE MASK FOR PRINTING DEVICE

This is a continuation of application Ser. No. 865,638, filed May 15, 1986, now abandoned, which is a continuation of application Ser. No. 523,997, filed Aug. 17, 1983, now abandoned, which is a continuation of application Ser. No. 309,521, filed on Oct. 7, 1981, now abandoned.

BACKGROUND OF THE INVENTION

The present invention relates to a liquid crystal optical device, and more particularly to a liquid crystal optical device having an optically active nematic liquid crystal composition capable of dielectric relaxation at low frequencies for high-speed responsiveness. The optical device is particularly well suited for use in a printing device including a liquid crystal light valve.

It is known to use a liquid crystal device as a light modulation element in a printing device, a signal reading device, a signal converting device, a light signal switch, a device for adjusting a quantity of light, or simply as a light valve. (See, for example, Japanese laid-open patent publications Nos. 50-74340, 50-102343, 51-26053, 49-66149 and 51-80242.) The disclosed proposals have merely been indicative of ideas in principle, and have not been feasible as a practical matter because conventional liquid crystal materials and systems for driving the liquid crystals have only attained a speed of responsiveness (from several tens msec. to several hundreds msec.) and a frequency of repetition (from 10 to 1 Hz). Hence, they have not been completely satisfactory for the foregoing intended applications.

As semiconductor technology has advanced to render CPU's, memories and the like less costly, more and more people other than specialists handling EDP's are having a chance to use microcomputers and office computers and to deal with the printouts of their computers. Stated otherwise, there has been a great need for output processing at the same level as ordinary documents. This includes outputs expressed in Chinese characters and Kana (Japanese syllabary), word processors for the Japanese language being an example.

Although circuits and memories now do much to improve such a system in view of their ever reducing cost, printers as system output terminals require a resolving power as high as 32×32 dots suitable for printing Chinese characters which add to the cost of the systems. The printers should operate at speeds high enough to meet the high resolution requirement and compensate for low speed operation needed for high resolution printing. Devices available at the present time designed to meet the foregoing requirements are electro-photographic printers using lasers or OFT and multi-stylus electrostatic printers. Both of these are very expensive and the greatest item which increases the cost of the systems. Thus, unavailability of desireable printers constitutes a bottleneck in popularizing the foregoing various systems in the market even though a need for such systems exists in the market. This situation basically holds true for high-speed facsimile, CRT hardcopiers and various other terminals.

With these points in view, the present invention is aimed at increasing high-speed responsiveness and provides a liquid crystal optical device which is quite effective for meeting all of the abovementioned applications. The present invention also provides a printing device of the liquid crystal light valve type. Such devices have been considered to be difficult to produce as a practical matter due to a variety of technological problems.

High speed light valves for the foregoing and other applications are required to have the following characteristics: (1) They should be closed at high speeds; (2) They should be opened at high speeds; (3) They should be able to be opened and closed in short periods of time; (4) They should not allow much leakage of light when closed; and (5) They should have a high transmissivity of light when opened. With these characteristics in mind, conventional liquid crystal devices as light valves will be described to highlight their disadvantages. In order to achieve characteristics (4) and (5) above, twisted nematic liquid crystals are most effective for minimizing leakage of light. With the twisted nematic liquid crystals, leakage of light when the light valve is closed can be reduced to almost nothing by arranging polarizing planes of polarizers perpendicularly to each other. It is easy for some polarizers used to have 100/1 as a ratio of light transmission when the light valve is opened to light transmission when the light valve is closed. With this ratio, the light transmissivity while the light valve is opened is from 20 to 40%, which meets the condition of (5). Other liquid crystals than twisted nematic liquid crystals cannot satisfy the conditions (4) and (5).

For example, a dynamic scattering system, a guest-host system with a two-colored dye added to a nematic liquid crystal for a display, or a nematic-cholesteric phase-transition system allow much leakage of light, thus being unable to meet characteristic (4). Conditions (4) and (5) cannot be met by a system utilizing birefringence of liquid crystal molecules, since such a system only has an opening and closing function with respect to light of a particular wavelength, but not an opening and closing function with respect to all visible light.

Accordingly, it is desireable to provide a liquid crystal optical device which is capable of operating at high speed and will not allow much leakage of light when closed and has a high transmissivity of light when opened. Such a device will permit construction of an electro-photographic pictuure of high resolving power and high quality which will operate at high speed, is simple in construction, reliable in operation, of a small size and inexpensive to construct.

SUMMARY OF THE INVENTION

Generally speaking, a liquid crystal optical device including a first transparent plate having at least one common electrode and an opposed transparent plate disposed in confronting relation to the first-mentioned transparent plate and having a plurality of signal electrodes disposed thereon, a liquid crystal composition sealed between the transparent plates and polarizer is disposed on each side of the liquid crystal panel is provided. The liquid crystal composition includes a nematic liquid crystal material having dielectric anisotropy which becomes zero at a crossing frequency (hereinafter referred to as "fc") of 100 kHz, or below at ordinary temperatures, and an optically active material added to the nematic liquid crystal material. The optical device further includes a drive circuit for selectively applying a signal having a frequency higher than fc (hereinafter referred to as "fh") and a signal having a frequency lower than fc (hereinafter referred to as "fl") across the common electrode and the signal electrodes for opening and closing the liquid crystal optical device.

The liquid crystal layer has a thickness which is three times or less as large as the helical pitch of the liquid crystal composition. In a preferred embodiment, the two polarizers are disposed with their polarizing axes perpendicular to each other and the optical device is closable by application of a signal of frequency fl across opposed electrodes and the optical device is openable by application of the signal of frequency fh across the opposed electrodes.

A printing device in accordance with the invention includes a light signal generator having a source of light, a liquid crystal light valve including the liquid crystal optical device in accordance with the invention and liquid crystal driving circuit, a photosensitive member, a developing section and a fixing section.

Accordingly, it is an object of the invention to provide an improved liquid crystal optical device.

It is another object of the invention to provide an improved liquid crystal optical device including an optically active nematic liquid capable of dielectric relaxation at low frequencies for high-speed responsiveness.

It is a further object of the invention to provide high-speed light valves which may be closed and opened at high speed within small periods of time, do not allow much leakage of light when closed and have a high transmissivity of light when opened.

Still another object of the invention is to provide an improved liquid crystal composition including a nematic liquid crystal composition including an optically active liquid crystal material.

Still a further object of the invention is to provide an improved printing device including a liquid crystal light valve.

Yet another object of the invention is to provide an improved electro-photographic printer.

Yet a further object of the invention is to provide an improved printing device including a high-speed liquid crystal light valve.

Another object of the invention is to provide an improved printing device including a high-speed liquid crystal light valve wherein the liquid crystal composition includes an optically active material added to a nematic liquid crystal material.

Still other objects and advantages of the invention will in part be obvious and will in part be apparent from the specifications.

The invention accordingly comprises compositions possessing the characteristics, properties and relation of components which will be exemplified in the compositions described and the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which:

FIG. 52 is an exploded perspective view of a liquid crystal light valve unit for use in an embodiment of the present invention;

FIG. 53 is a cross-sectional view of the liquid crystal light valve unit of FIG. 51;

DESCRIPTION OF THE PREFERRED EMBODIMENT

A conventional twisted nematic liquid crystal system will be described first as an illustrative example. Although the description is sufficient for applications which do not need to meet the characteristics (4) and (5) noted above, the principles of the present invention permit use for applications which do not need to meet conditions (4) and (5).

Figure 1:
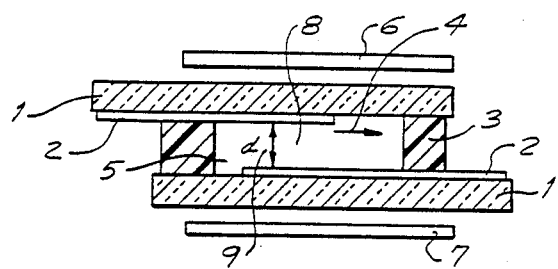
FIG. 1 is a cross-sectioned view showing the structure of a liquid crystal panel.

FIG 1. shows the arrangement of a twisted nematic liquid crystal panel. A liquid crystal composition 8 is sandwiched between transparent base plates 1 of glass sealed by a seal 3 and having transparent electrodes disposed thereon. Base plates 1 are rubbed in directions 4 and 5 such that liquid crystal molecules in composition 8 are oriented parallel to planes of the base plates 1. Direction 4 extends from the left to the right, and direction 5 extends away from the viewer into the paper. The major axes of the liquid crystal molecules are arranged in the directions of rubbing at the glass wall surfaces for twisted nematic molecular orientation. A pair of polarizers 6 and 7 are disposed outside plates 1 and are preferably arranged so that their polarizing directions will extend perpendicularly to each other. This minimizes the amount of leakage of light therethrough when the light valve is closed. The directions of rubbing preferably coincide with or extend normally to the directions of polarization for increased light transmission when the light valve is opened. Designated at 9 is the thickness of the liquid crystal layer which will hereinafter be indicated as "d."

Figure 2:
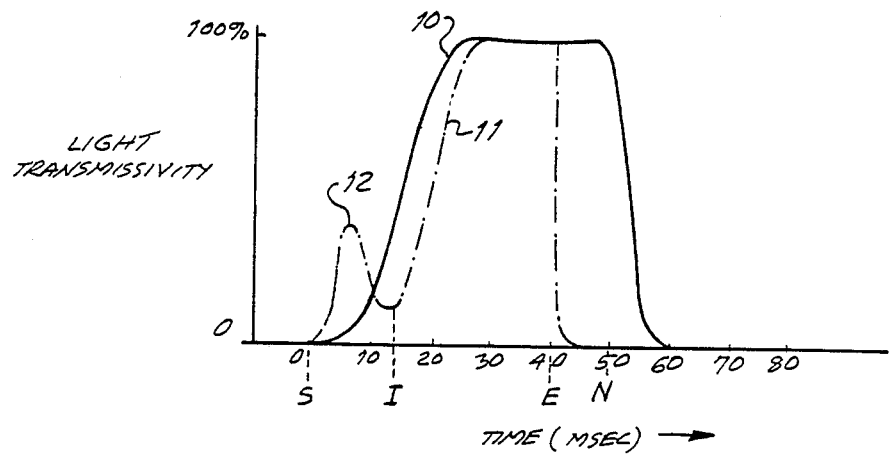
FIG. 2 is a graph showing responsiveness characteristics of a twisted nematic liquid crystal.
Figure 3:
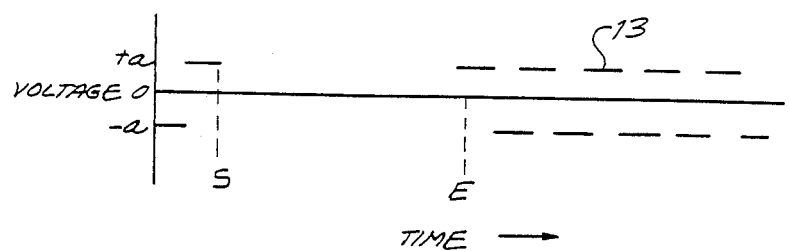
FIG. 3 is a graph illustrating a liquid crystal driving signal.

The responsiveness characteristic of the twisted nematic liquid crystal panel of FIG. 1 thus constructed is shown in FIG 2. The nematic liquid crystal composition E24LV was used which is primarily a biphenyl liquid crystal manufacuted by BDH, Co. The characteristics of the liquid crystal panel were measured at a temperature of 40° C., the thickness of the liquid crystal layer being about 5 $\mu$n. The graph of FIG. 2 has a horizontal axis indicating time in terms of milliseconds, and a vertical axis indicating light transmissivity in terms of percentage. Light transmissivity is 100% with only two polarizers having parallel polarizing axes. FIG. 3 shows signals applied between the electrodes at voltages $+a$ and $-a$ (V) with no voltage applied in an interval of time between points S and E. Curves 10 and 11 of FIG. 2 indicate responsivenesses of the liquid crystal when the voltages of $a=3.5(V)$ and $a=20(V)$ are applied, respectively. With respect to responsiveness characteristics of twisted nematic liquid crystal panels, the time before a point I is frequently called a "rise time" and the time after a point E or N is frequently called a "fall time." Such designations will be used in the present description.

Curve 10 shows responsiveness when a normal voltage is applied, the rise and fall times being several tens of milliseconds. Curve 11 was obtained when a higher voltage was applied and shows a much faster rise time, but a slower fall time past a peak indicated at 12. Peak 12 is derived from an intrinsic property of the twisted nematic liquid crystal. For the higher the applied voltage is, the longer time is needed to rearrange the twisted nematic molecular orientation when the applied voltage is cut off. The responsiveness shown in FIG. 2 represents the general characteristic of twisted nematic liquid crystal panels, including E24LV manufactured by BDH, Co. The conventional twisted nematic liquid crystal panels are therefore disadvantageous in that the response time, particularly the fall time cannot be reduced. One way to solve the problem is to utilize the phenomenon of dielectric relaxation in the direction of major axes of liquid crystal molecules for switching with signals of two different frequencies.

Figure 4:
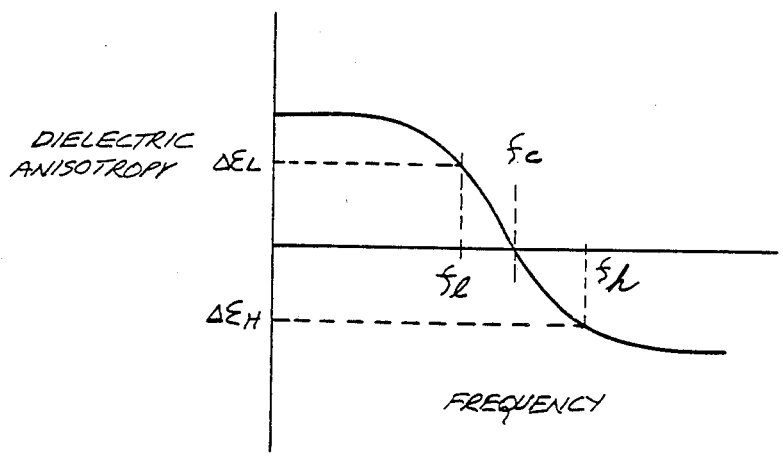
FIG. 4 is a graph showing a general frequency characteristic of dielectric anisotropy of a liquid crystal composition in which dielectric relaxation can occur and dielectric anisotropy is reversible.
Figure 5:
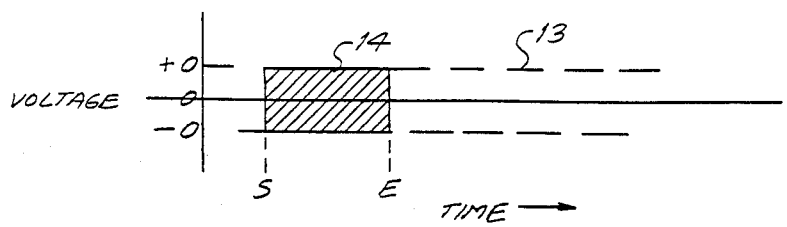
FIG. 5 is a graph illustrating liquid crystal driving signals with two switchable frequencies.

FIG. 4 illustrates generally the frequency characteristic of dielectric anisotropy of a liquid crystal composition in which dielectric anisotropy is reversible. Assuming that a component of the dielectric constant parallel to the axes of liquid crystal molecules is indicated by $\epsilon_{\parallel}$ and a component thereof normal to the axes of liquid crystal molecules is indicated by $\epsilon_{\perp}$, dielectric anisotropy can be expressed by $\epsilon_{\parallel} - \epsilon_{\perp}$. In FIG 4., a frequency at which the dielectric anisotropy becomes zero is called a "crossing frequency," indicated as "fc." The dielectric anisotropy is reversed at frequencies above and below crossing frequency fc. It is assumed that a frequency below crossing frequency fc is indicated as "fl," a frequency above the crossing frequency fc is indicated as "fh," the dielectric anisotropy at frequency fl is indicated as "$\Delta\epsilon_L$," and the dielectric anisotropy at frequency fc is indicated as "$\Delta\epsilon_H$." $\Delta\epsilon_L$ is positive and $\Delta\epsilon_H$ is negative. When the signal of fl is applied to a twisted nematic liquid crystal panel employing a nematic liquid crystal having such a property, the major axes of liquid crystal molecules extend parallel to the electric field produced. When the electric field is removed, the liquid crystal molecules are rearranged into a twisted nematic orientation. Stated otherwise, the panel has responsivenesses as shown in FIG. 2 in response to the applied signals as shown in FIG. 3, as with the general twisted nematic liquid crystal panels. (Since the example given in FIG. 2 is indicative of a characteristic of E24LV, actual values of voltages and response times may differ dependent on liquid crystal compositions used.) The applied signal 13 has a frequency fl, and the two polarizers have polarizing axes which extend perpendicular to each other. Then, signals as illustrated in FIG. 5 are applied, the signals being different from those of FIG. 3 in that signal fh is included in a region indicated at 14. When signal fl is applied, the major axes of liquid crystal molecules are forced to extend parallel to the electric field. Application of signal fh thus produces a force tending to bring the major axes of the liquid crystal molecules parallel with surfaces of the electrodes.

Figure 6:
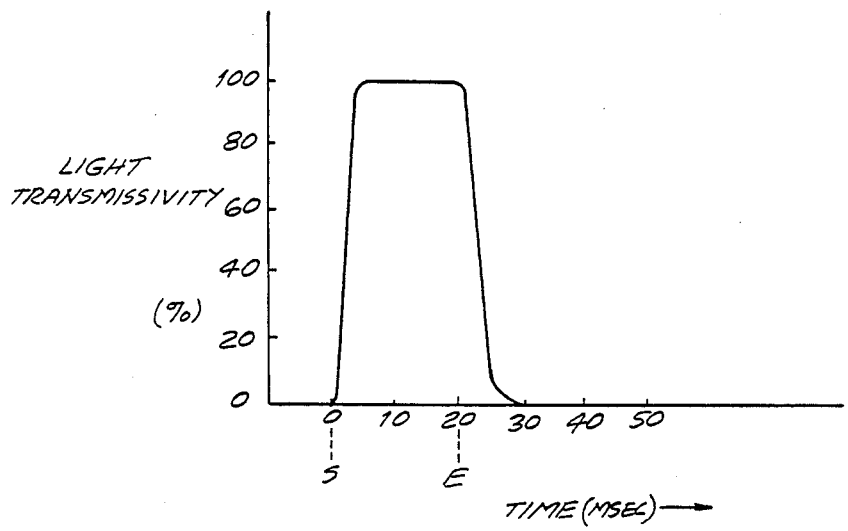
FIGS. 6 and 7 are graphs illustrating responsiveness characteristics of nematic liquid crystal compositions capable of dielectric relaxation, which are obtained by selectively applying signals of two frequencies.
Figure 7:
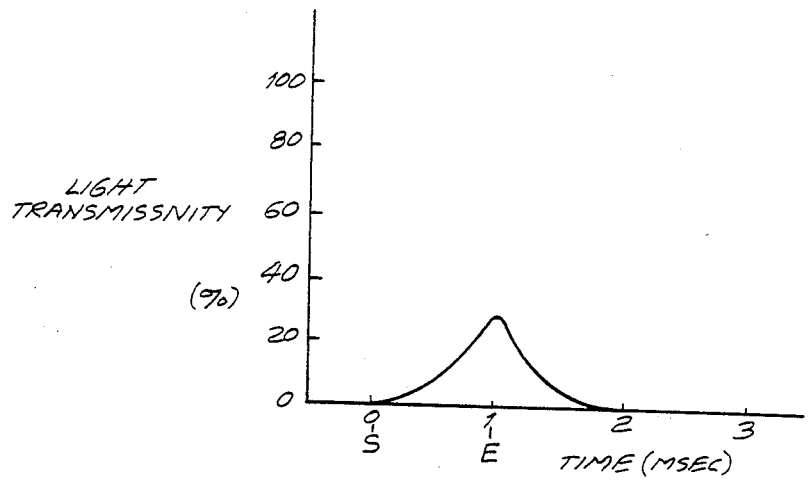

Nematic liquid crystal 1085 manufactured by Merck & Co., Inc. produces dielectric relaxation at ordinary temperatures. FIG. 6 illustrates the characteristic of this liquid crystal in response to signals applied. The liquid crystal was measured at a temperature of 40° C. with the thickness of the liquid crystal layer being about 5 $\mu$m, fl: 1 KHz, fh: 100 KHz, and the voltage a=20 (V). The curve of FIG. 6 shows that fall time is faster than that of the ordinary twisted nematic liquid crystal panel as shown in FIG. 2. This is because application of a signal of fh forcibly reduces the fall time. With the phenomenon of dielectric relaxation of the liquid crystal molecules being thus utilized, the fall time can be reduced from the disadvantageously long interval with the normal twisted nematic liquid crystals. This arrangement however cannot meet the foregoing characteristics required of a high-speed light valves. FIG. 7 shows the responsiveness characteristic of Merck's nematic liquid crystal 1085 obtained when a signal of 100 KHz was applied during one millisecond at the voltage a=30(V) with the same conditions as those for the characteristic curve in FIG. 6. The responsiveness characteristic of FIG. 7 indicates insufficient response times and light transmissivity.

The foregoing conventional arrangements show that the characteristics, such as, response times, which are required of high-speed light valves cannot be realized. Hence, various devices utilizing liquid crystal light valves have not been prepared as a practical matter.

Figure 8:
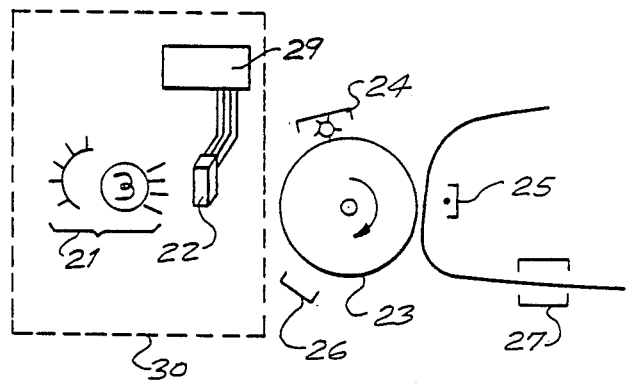
FIG. 8 is a schematic view of a printing device including a liquid crystal light valve.
Figure 9:
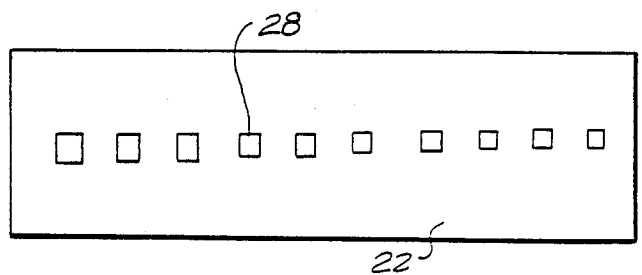
FIG. 9 is a cross-sectional of a liquid crystal light valve suitable for use in a printing device.

The general structure of a conventional printing device using a liquid crystal light valve and the problems encountered with such a printing device will be described. Referring to FIGS. 8 and 9, a printing device including a liquid crystal light valve 22 is shown schematically. A source of light 21 is energized at all times to illuminate valve 22 continuously. Liquid crystal light valve 22 has a plurality of minute shutters 28 which are independently optically openable and closable by a liquid crystal driving circuit 29 to allow and prevent light transmission from light source 21. These parts jointly constitute a light signal generator 30. Light signals thus generated will reach a photosensitive member 23 of photosensitive material which has been charged by a charging station 26, whereupon the area of member 23 hit by the light signals is discharged. Therefore, electrostatic latent image is formed on photosensitive member 23 in accordance with the external writing signals. The electrostatic latent image thus created is developed at a developing section 24 with coloring toner. The toner image is transferred at a transferring section 25 onto a recording material, such as, for example paper and fixed with heat at a fixing section 27, thereby producing a completely fixed printed image.

Since such a system does not require what corresponds to a precision and high-speed optical scanning system as in a laser printer, the described system has various merits, such as a simpler structure and a reduced cost of manufacture. However, known printing devices have not been practical due to a fatal problem, that is, the slow speed of writing.

Printers for the above-mentioned various systems proposed require a printing speed which allows ten prints of the A4 size to be produced per minute and a resolving power of about 10 dots per 1 m/m. State otherwise, such performance requires a printing speed of approximately 500 lines in one second, that is, one line which can be written in 2 m sec. or less. The time interval of 2 m sec. for opening shutters cannot be achieved by a conventional twisted nematic liquid crystal driven by a normal alternating voltage.

While there is demand for printing devices which will operate at such high speeds, is of high quality, less costly and small in size, there are no available proposals which sufficiently meet such a requirement. The present invention satisfies such demand and provides a printing device which will operate at a sufficiently high speed, is of high quality, and is small in size and less costly to construct.

Figure 10:
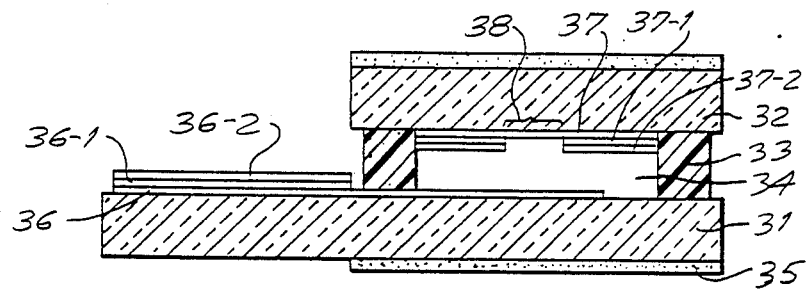
FIG. 10 is a cross-sectional view of another liquid crystal light valve.

FIG. 10 illustrates a liquid crystal panel including construction of a liquid crystal light valve particularly well suited for use as a light valve for a printing device. Designated at 31 is a glass plate having signal electrodes 36, 36-1 and 36-2 thereon. Electrode 36 is a transparent body of indium oxide or stannous oxide, and electrodes 36-1, 36-2 are made of chromium and gold, respectively. A glass plate 32 supports common electrodes 37, 37-1 and 37-2 thereon. Electrode 37 is also transparent, and electrodes 37-1 and 37-2 are opaque bodies of a metal material. A transparent portion 38 corresponds to shutters 28 as shown in FIG. 9. Glass plates 31 and 32 are fixed together by sealant 33 to provide a space 34 in which a liquid crystal compound 34 is sealed and polarizers 35 are positioned on both sides of the device.

Figure 11:
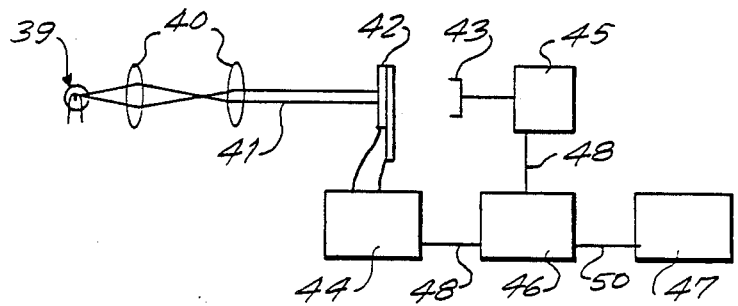
FIG. 11 is a block diagram of an instrument for measuring responsiveness characteristics of light transmission of the liquid crystal light valve according to the present invention.

The advantageous features of liquid crystal light valve of the present invention having a responsiveness characteristic of light as transmitted through the liquid crystal light valve will first be described prior to the description of the printing characteristic. FIG. 11 is a block diagram of an optical measurement device which was used to measure light transmission responsiveness of a liquid crystal light valve according to the present invention. Light from a light source 39 is converted into parallel rays of light 41 by a lens 40 which illuminates a liquid crystal light valve 42. Liquid crystal light valve 42 is driven by a driver unit 44 to allow light to be transmitted though light valve 42 and fall upon a light detector 43. Signals 49 amplified by an amplifier 45 are stored in a digital memory 46 by synchronous signals 48 from driver unit 44. Signals from memory 46 are recorded by a recorder 47. The light transmission responsiveness of a liquid crystal valve was measured in the above process. Values with respect to the liquid crystal compound, such as dielectric anisotropy, fc and the like referred to in the present description were measured by multi-frequency LCR meters 4274A and 4275A manufactured by YNP, Co.

Characteristics required of a liquid crystal light valve are as follows:

(1) The liquid crystal light valve should have a high frequency of repetition and should not exhibit hysteresis; and (2) The liquid crystal light valve should have a large light transmissivity while it is open.

The foregoing two are important characteristics to be met. The reciprocal of the frequency of repetition is an inteval of time for writing a single line.

The requirement that the liquid crystal light valve have no hysteresis is a very important consideration. Conventionally, the dynamic drive system of a liquid crystal device relies on the cumulative response effect which is a hysteresis effect of the liquid crystal. Such an effect is utilized with ordinary twisted nematic liquid crystals and a two-frequency dynamic drive system. However, such an effect is disadvantageous for the high-speed liquid crystal light valve according to the present invention, and hence should be avoided as much as possible. The hysteresis effect can be reduced by applying a signal of fl during a interval of time for one writing which makes the potential level in the liquid crystal uniform at all times, and then driving the liquid crystal for entering the next interval of time for writing.

The expression, "It is open," in the requirement (2) above means that a signal for opening the shutter is applied, or the shutters are actually open (both are substantially the same in meaning.). The expression "an opening interval of time" as described below means an interval of time during which a signal for opening the shutters is applied.

Figure 12:
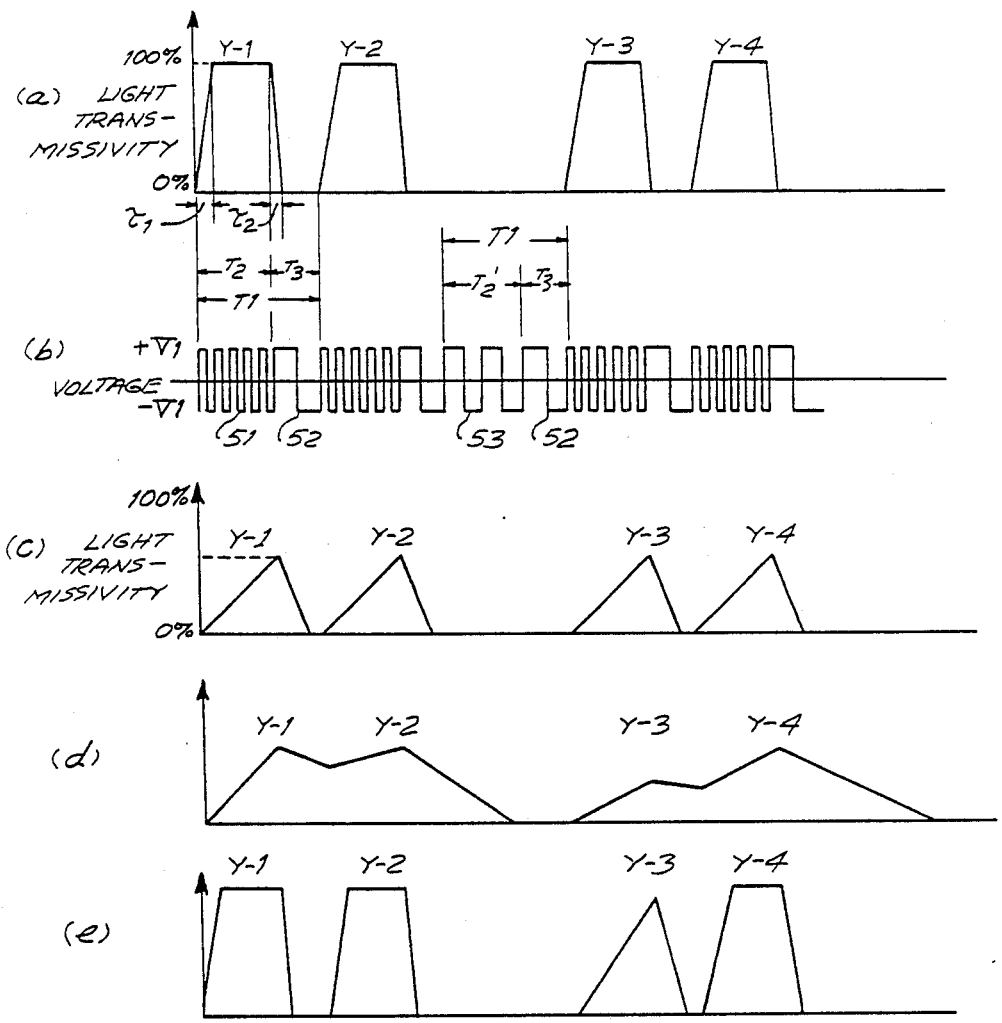
FIGS. 12(a)–(e) are graphs showing waveforms of a drive signal used for the present invention and responsiveness characteristics of light transmission.

The light transmissivity of a liquid crystal light valve will now be described with reference to FIG. 12. FIG. 12 shows an ideal light transmissivity at (a) obtained when signals at (b) are applied to a liquid crystal valve. Indicated at V1 is the voltage, at T1 is the interval of time for writing, and T2 is an opening interval of time. A signal 51 applied during time interval T2 has a frequency higher than fc, such frequency being referred to as fh. The shutter allows 100% of the light to be transmitted during a time interval $t_1$ after signal 51 is first applied. (It is assumed that light transmission is 100% when the polarizing planes of the two polarizers are parallel to each other, and that light transmission is 0% when the poarizing planes are perpendicular to each other.) A signal 52 of frequency fl applied during interval of time T3 is below fc, and is referred to as fl. The shutter is closed time interval $t_2$ after application of signal 51 ceases. Although interval of time T2' is equal to time interval T2, the frequency of signal 53 applied during T2' is different from fh in that signal 53 does not open the shutter. (While the frequency of the signal 52 may be of any value and may even be higher than fc so long as it does not open the shutter, it is preferably the same as fl for the ease with which signals are generated.)

Signals for driving the liquid crystal light valve according to the present invention will now be described. As illustrated in FIG. 12 at (b), T1 represents a period of time for writing (or an interval of time for writing), T2 an opening interval of time, T2' a non-opening interval of time, and T3 a closing interval of time. The interval of time T1 for writing includes the opening interval of time T2 and the closing interval of time T3, or of the non-opening interval of time T2' amd the closing interval of time T3. The signal of fh is basically applied during the opening interval of time T2. However, a signal of other frequencies for opening the liquid crystal light valve will suffice (for example, a combination of fh and fl may be suitable with fh certain to open the liquid crystal light valve).

The signal of fl is applied during the closing interval of time T3. However, a signal of other frequencies for closing the liquid crystal light valve will suffice (for example, a combination of fl and fh may be suitable with fl certain to close the liquid crystal light valve.). During the interval of time T2', a signal which does not render the liquid crystal light valve open is applied. More specifically, a signal which is supposed to open the liquid crystal light valve, but does not during T2' because of slow responsiveness will suffice. For example, such a signal may be of a zero voltage applied to the liquid crystal light valve, may be of a frequency higher than fc but slow is responsiveness, and may be of a frequency of fl. The foregoing signals may be of a rectangular waveform, a sine waveform, or other waveforms.

Light transmission responsiveness will again be described. An ideal light transmission property, as shown in FIG. 12 at (a), has short $t_1$, $t_2$, allows 100% light transmission, exhibits no hysteresis (responsiveness is governed only by a signal applied irrespective of previous history, r-1, r-2, r-3, r-4 having the same responsiveness), and has a short interval of time T1 for writing. While 100% light transmission is not reached with no hystersis exhibited for an example (c), a liquid crystal light valve having the characteristic (c) will suffice since irregularities in light transmission responsiveness do not exist, and an amount of light transmitted can be increased by using a more powerful source of light. At curve (d), r-1, r-2, r-3, r-4 are all different and light transmission again does not each 100%. At curve (e), some signals allow 100% light transmission, but not all at the same responsiveness. Prior twisted nematic liquid crystal displays and two-frequencies driving displays have relied on the cumulative response effect for display. Although liquid crystals exhibit substantial hysteresis, such an effect should be reduce as much as possible to obtain characteristics suitable for liquid crystal light valves.

Figure 13:
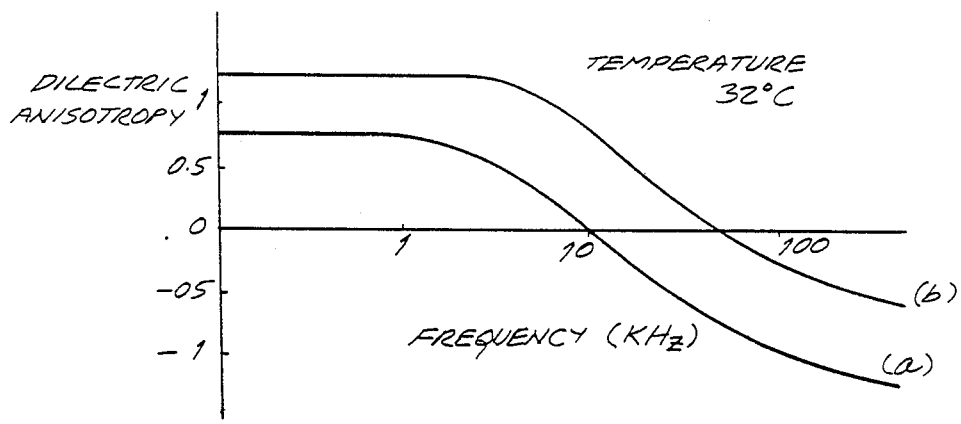
FIG. 13 in a graph showing the frequency characteristics of the dielectric anisotropy of nematic liquid crystal No. 1085 manufactured by Merck & Co., Inc. with curve (a) being illustrative of the characteristic of a liquid crystal without optically active material added, and curve (b) showing the characteristic of a liquid crystal with an optically active material added in accordance with the invention.
Figure 14:
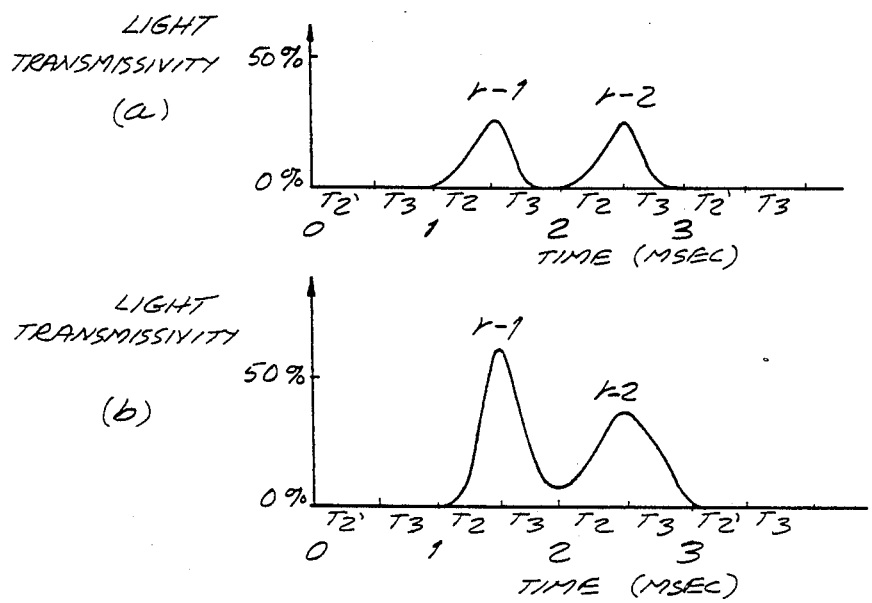
FIGS. 14(a) and (b) are graphs showing responsiveness characteristics of light transmission of conventional liquid crystal compositions.

Actual measurements in a liquid crystal light valve as shown in FIG. 10 will now be described. FIG. 13 shows at (a) the frequency characteristic of dielectric anisotropy of nematic liquid crystal NO. 1085 manufactured by Merck & Co. Inc., which is known as a liquid crystal which can produce dielectric relaxation. A layer of this liquid crystal having a thickness of 5μ was measured for light transmissivity at a temperature of 40° C., fl of 1 KHz, T1 of 2 m sec., T2 of 1 m sec., V1 of 30 V and fh of 100 KHz and 130 KHz. The measurements are shown in FIG. 14 at (a) and (b). A signal of fh was applied in time interval T2, and signals of fl were applied in time intervals T2' and T3. At (a), r-1 and r-2 show the same responsiveness irrespective of the previous conditions and have a maximum light transmissivity of 25%, but are characteristics which can be suitable for a liquid crystal light valve. Measurements of (b) have different r-1 and r-2, and are not suitable for characteristics of a liquid crystal light valve. The example of (a), though acceptable, has a 25% light transmissivity which is disadvantageous in that light transmissivity varies substantially as fh varies slightly. Additionally, responsiveness changes as temperature varies slightly. The present invention eliminates all of these problems and provides a liquid crystal light valve which will operate at quite a high speed and is of increased light transmissivity.

Accordingly, two important aspects of the present invention, first an optically active material is added to a nematic liqud crystal which can cause dielectric relaxation to produce a cholesteric liquid crystal capable of causing dielectric relaxation. The cholesteric liquid crystal is drivable by signals of fl and fh (the cholesteric liquid crystal herein used includes not only derivatives of cholesterol, but also liquid crystal compounds having cholesteric liquid crystal ordering by adding an optically active material such as a chiral nematic liquid crystal to a nematic liquid crystal). Secondly, the helical pitch of the cholesteric liquid crystal of the present invention is substantially the same as the distance between the two glass plates. Thirdly, since the display device (for switching between light and dark indication) relies on the characteristic of polarizers, the liquid crystal light valve can be closed completely. Fourthly, as shown at (b) in FIG. 12, the shutter is closed and then opened for successive opening thereof. In other words, time interval T2 for the application of a signal of fh is constant, and a signal of fl is applied during time interval T3 in time interval T1 for a single writing.

Figure 15:
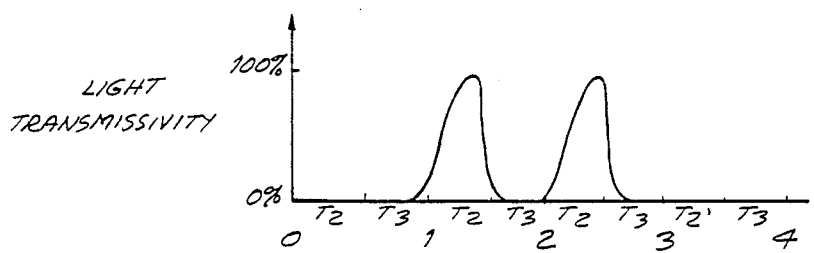
FIG. 15 is a graph showing the responsiveness characteristic of light transmission of a liquid crystal according to the present invention.

The characteristic of light transmission responsiveness of a liquid crystal light valve according to the present invention, which has the foregoing feature will be described. FIG. 15 illustrates the light transmission responsiveness characteristics of a liquid crystal light valve according to the present invention. The measurement conditions were as follows; thickness of a liquid crystal layer: 5μ; temperature: 35° C.; fl: 2 KHz; fh: 130 KHz; T1: 2 m sec; T2: 1 m sec and V1: 30 V. The maximum light transmissivity was 100% compared to the results example of (a) in FIG. 14 which had a maximum light transmissivity of only 25%.

The difference between the transmissivity of the examples of FIG. 14 and the example of FIG. 15 is based on the difference between liquid crystal compounds used. The examples of FIG. 14 used nematic liquid crystal NO. 1085 manufactured by Merck & Co., Inc. and the example of FIG. 15 in accordance with the present invention used a cholesteric liquid crystal having a long helical pitch. This latter crystal composition was prepared by addiing to the foregoing nematic liquid crystal (Merck NO. 1085) 3 percent by weight of an optically active material, such as, 4-(2-methylbutyl)-4'-cyanobiphenyls. The frequency characteristic of dielectric anisotropy of this liquid crystal compound is shown in FIG. 13 at (b). It indicates higher fc than that for curve (a) which was obtained without addition of an optically active material, and a greater dielectric anisotropy at 0 Hz than that for curve (a). Thus, addition of an optically active material advantageously resulted in an increase in dielectric anisotropy and an increase in light transmissivity of the liquid crystal light valve. Another advantage is that hysteresis has been eliminated.

The present invention will now be described for its usefulness with reference to examples using other liquid crystal compositions. Nematic liquid crystal compositions such as the composition listed in Table 1 exhibit dielectric relaxation at room temperature. These compositions are substantially the same as those in Example 3 described in Japanese Patent Application No. 55-81246 (hereinafter referred to as "Liquid Crystal-I"). Liquid Crystal-I is not optically active.

TABLE I

| Compounds | Percentage of mixture (wt %) |
|---|---|
| 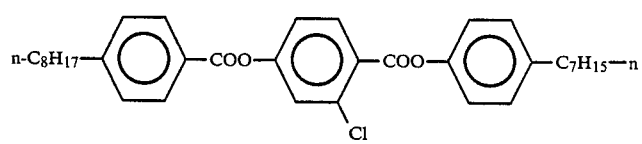 | 8 |
| 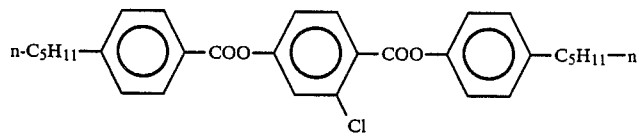 | 8 |
| 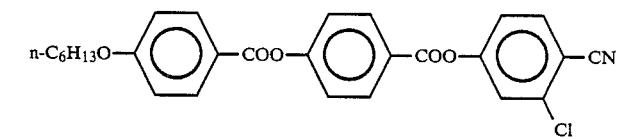 | 6 |
| 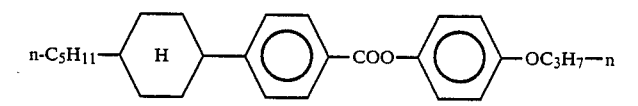 | 6 |
| 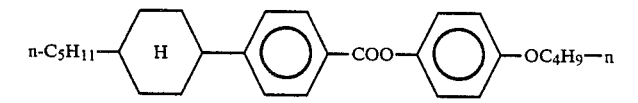 | 6 |

TABLE I-continued

| Compounds | Percentage of mixture (wt %) |
|---|---|
| 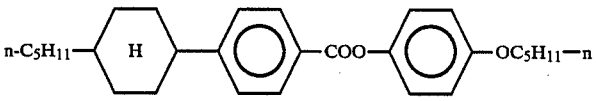 n-C$_5$H$_{11}$—H—◯—COO—◯—OC$_5$H$_{11}$—n | 6 |
| 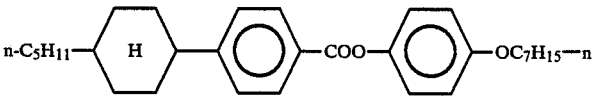 n-C$_5$H$_{11}$—H—◯—COO—◯—OC$_7$H$_{15}$—n | 6 |
| 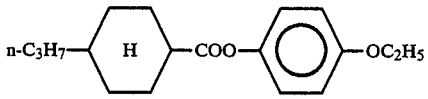 n-C$_3$H$_7$—H—COO—◯—OC$_2$H$_5$ | 12 |
| 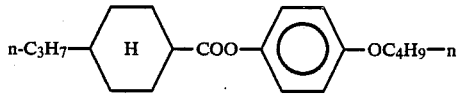 n-C$_3$H$_7$—H—COO—◯—OC$_4$H$_9$—n | 12 |
| 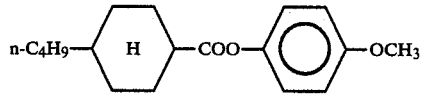 n-C$_4$H$_9$—H—COO—◯—OCH$_3$ | 12 |
| 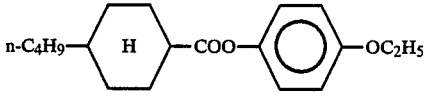 n-C$_4$H$_9$—H—COO—◯—OC$_2$H$_5$ | 12 |
| 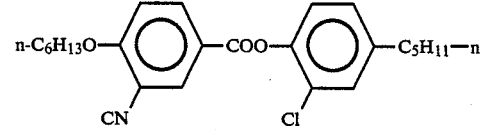 n-C$_6$H$_{13}$O—◯(CN)—COO—◯(Cl)—C$_5$H$_{11}$—n | 6 |

 —H— represents a transcyclohexane and  represents a benzene ring.

Figure 16:
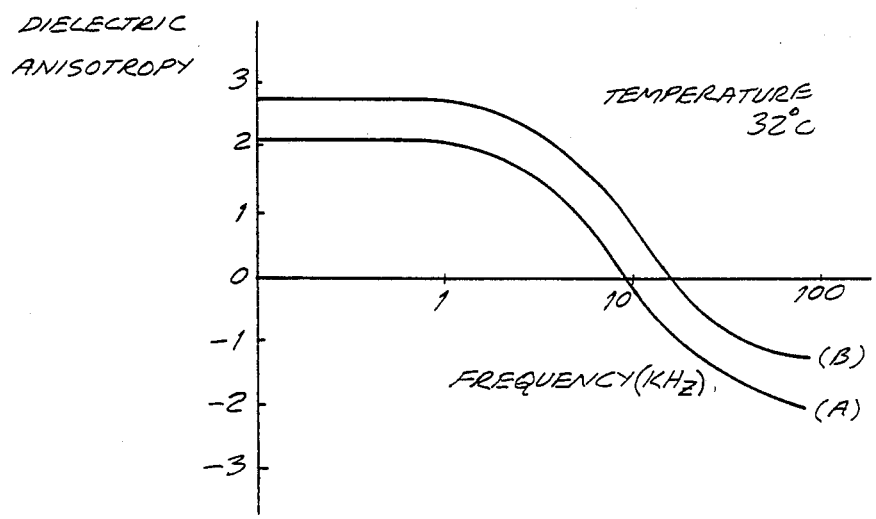
FIG. 16 is a graph showing the frequency characteristics of the dielectric anisotropy of a liquid crystal compound used in accordance with the present invention, curve (a) illustrating the characteristic of a liquid crystal compound without optically active material added, and curve (b) showing the characteristic with an optically active material added.
Figure 17:
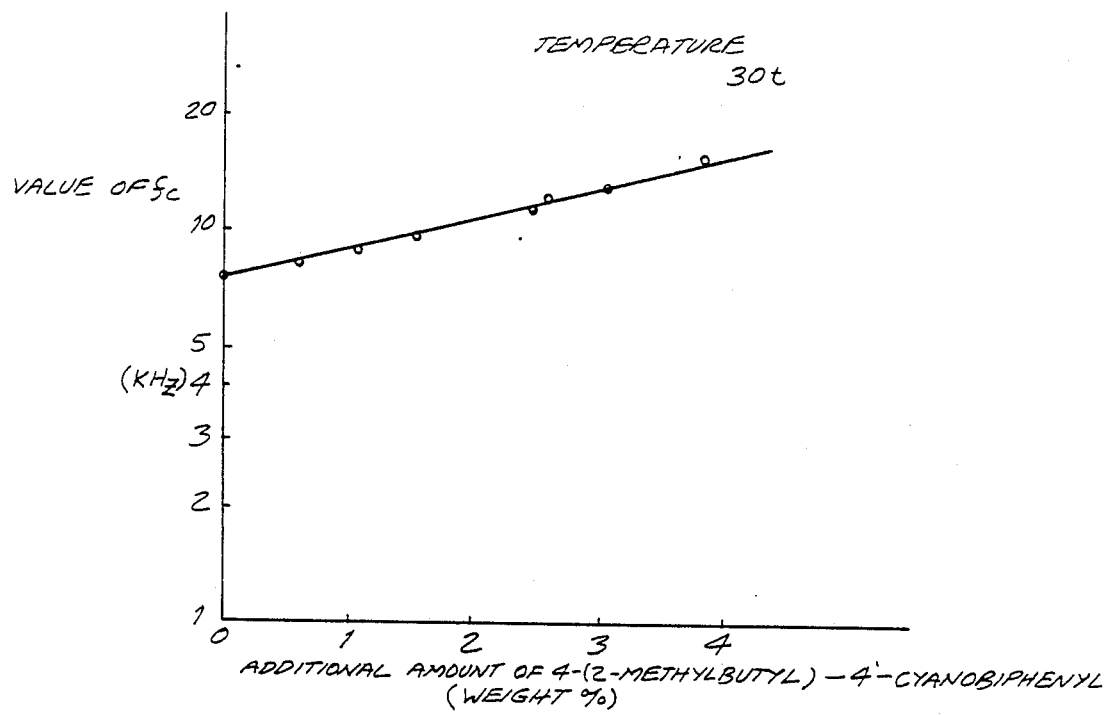
FIG. 17 is a graph showing the deviation of frequency fc with respect to the amount of an optically active material added.

FIG. 16 shows at (a) the frequency characteristic of dielectric anisotropy of the nematic liquid crystal compounds indicated in Table 1 and at (b) the frequency characteristic of dielectric anisotrophy of a chholesteric liquid crystal compound having a long helical pitch obtained by adding to the composition of Table I having the characteristic curve (a) 3.05 percent by weight of the foregoing optically active material, 4-(2-methylbutyl)-4'-cyanobiphenyls. FIG. 17 shows the deviation in fc when the optically active material is added in varying amounts to the nematic liquid crystal composition of Table 1.

Figure 18:
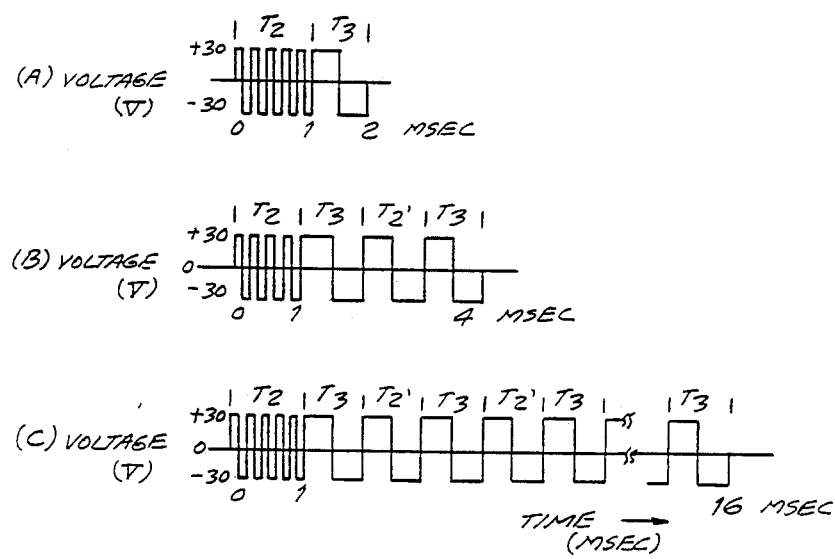
FIGS. 18(a)–(c) show drive signals for a liquid crystal light valve in accordance with the present invention.
Figure 19:
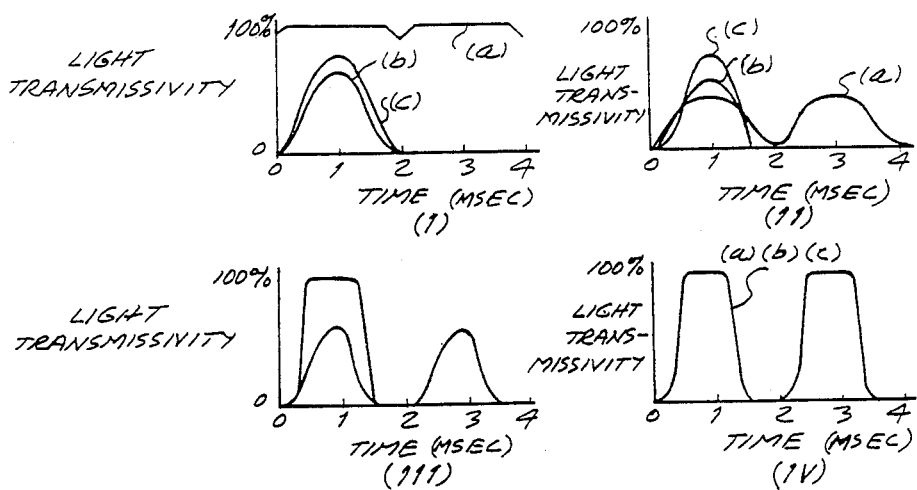
FIGS. 19(i)–(iv) are graphs showing responsiveness characteristics of light transmission of liquid crystal light valves in accordance with the present invention.

FIG. 19 shows the responsiveness characteristics of light transmission obtained when the amount of addition of the optically active material is changed. FIG. 19 illustrates at (i), (ii), (iii) and (iv) the characteristics of compositions including 0,0.6,2.45 and 3.05 percent by weight respectively, of the optically active material added. Curves (a), (b) and (c) represents the light transmissivity based on the different signals applied as shown in FIG. 18.

In FIG. 18 T2, T3 and T2' have the same meanings as those shown in FIG. 12 at (b). At (a) a combined waveform of a signal of fh applied for 1 m sec. and a signal of fl applied for 1 m sec. is shown, such combined signals being applied repetitively. At (b) a waveform of a signal of fh applied for 1 m sec. and a signal of fl applied for 3 m sec is shown, the combined signals being applied repetitively. At (c) a waveform of a signal of fh applied for 1 m sec. and a signal of fl applied for 15 m sec is shown, the combined signals being applied repetitively.

The signal (a) is applied for successive openings, the signal (b) is applied for one opening during two time intervals for writing, and the signal (c) is applied for one opening during four time intervals for writing. An ideal liquid crystal light valve must have the same responsiveness with respect to the opening signals during T2 at (a), (b) and (c).

FIG. 19 will now be described again wherein the signals were applied under the following conditions: temperature: 40° C.; thickness of the liquid crystal layer: 5 μm; fh: 100 KHz and fl: 1 KHz. FIG. 19 illustrates at (i) characteristics obtained without optically active material added. The liquid crystal light valve does not close when the signal of curve (a) of FIG. 18 is applied. When signals of curves (b) and (c) are applied, responsiveness of light transmission differs. At (ii) the characteristics with 0.6 percent by weight of the optically active material added are shown. The characteristics of (ii) are better than those of (i) in that the response to the signal of curve (a) exhibits better responsiveness. At (iii) the characteristics with 2.45 percent by weight of the optically active material are illustrated. While the response to signals of curves (b) and (c) are ideal, the response to the signal of curve (a) indicates a low light transmissivity. However, the response to the signal of curve (a) will be sufficient by reducing the repetitive frequency by half with T2 of 1 m sec. and T3 of 3 m sec. FIG. 19 shows at (iv) the characteristics obtained when 3.05 percent by weight of the optically active material is added. The characteristic curve coincides completely with the responsiveness characteristic of the ideal liquid crystal light valve as shown in FIG. 12 at (a). The period of time for writing is 2 m sec. which enables high-speed operation of a light valve.

A liquid crystal light valve having the responsiveness characteristic of light transmission as shown in FIG. 19 at (iv) is fully satisfactory for use as a light signal generator in a high-speed printer. Thus, as described above, a liquid crystal light valve which previously was merely an idea, and has not been practiced is now rendered feasible as a practical matter in accordance with the present invention.

The construction of a liquid crystal light valve of the present invention suitable for use in a printing device will be described once again. The structure of such a liquid crystal panel is as shown in FIG. 10. Two glass plates 31 and 32 are treated for horizontal molecular orientation. Glass plates 31 and 32 need not necessarily be oriented perpendicular to each other. However, parallel orientation preferably should be avoided. If they are oriented parallel to each other, the ratio of the intensity of light transmitted when the liquid crystal light valve is open to that when the light valve is closed would be small. Two polarizers 35 are disposed on the outer sides of glass plates 31 and 32. With polarizing planes of polarizers 35 perpendicular to each other, when the liquid crystal light valve is closed, the intensity of light transmitted is reduced to a minimum (reduced leakage of light), such leakage of light being controllable by adjusting the polarizing plane.

Orientation of liquid crystal molecules sealed within the device differs with the thickness of the liquid crystal layer and the amount of the optically active material. In the example of FIG. 19 at (iv) (treated for horizontal orientation with directions of orientation extending perpendicularly to each other) the liquid crystal has a helical structure twisted through one revolution and 90° (or 450°) without application of an electric field. At this time, the liquid crystal takes on a light blue color, as the helical pitch is short. When a signal of fl is applied, the liquid crystal molecules arrange parallel to the applied electric field and lose their optical activity. This results in a dark color due to the effect of the polarizers. With the electric field removed, only portions which have been subjected to the electric field are discolored. At this time, the molecules are ordered by a helical configuration twisted 270°. Upon elapse of a certain interval of time after the electric field has been eliminated, the liquid crystal molecules are reoriented to their initial state. When a signal of fh is applied, it is presumed that the molecules are also oriented in a helical configuration of 270°, as will be described with reference to FIG. 20.

When there is no electric field applied, the light transmissivity is C1 which is short of 100%. When a signal of fl is applied at E1, the light transmissivity becomes 0%. When the electric field is cut off at E2, the light transmissivity reaches C2 which is 100%. After a while, the light transmissivity decreases to C3 which is at the same level as C1. As signal of fl is applied at E3, and a signal of fh is applied at E4, whereupon the light transmissivity becomes C4 which is the same as C2, or 100%. Application of a signal of fl at E5 reduces the light transmissivity down to 0%. This constitutes a responsiveness characteristic of light transmission which is the same as at (iv) in FIG. 19.

Figure 20:
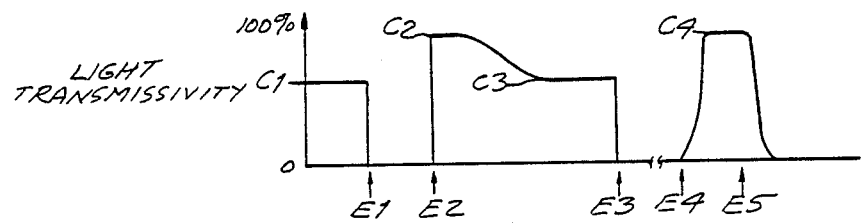
FIG. 20 is a graph showing light transmissivity of liquid crystal light valves in accordance with the present invention.

As described above, the liquid crystal molecules are stable when helically configured through 450°, but are ordered as a quasi-stable state by a helical configuration of 270° when responding to applied signals at a high speed. When a signal of fl is applied to a layer of the liquid crystal compound having a thickness of 8 μm, the liquid crystal layer is in a turbid state. Continued application of the signal of fl eliminates the turbidity, and application of a drive signal allows the liquid crystal layer to be operated normally. When the drive signal is applied while the liquid crystal layer is turbid, however, the light transmissivity is reduced. To cope with this problem, it is necessary to continue to apply the signal of fl across such a thick liquid crystal layer until the liquid crystal layer is no longer turbid. With a layer of the foregoing liquid crystal compound having a thickness of 4 μm, the above-mentioned phenomenon does not take place, and the molecules are ordered at all times by a helical configuration twisted through 270°. This liquid crystal layer has a light transmissivity which is 100% at all of C1, C2, C3 and C4 as indicated in FIG. 20.

This demonstrates that even with irregularities in thickness in the same cell and irregularities in light transmission when not in operation, application of a signal of fl for a predetermined interval of time eliminates irregularities in light transmitted and results in uniform light transmission. (Application of an actual drive signal takes more time, but achieves the same result as when only a signal of fl is applied). Therefore, a large-sized panel which is 20 cm long for use as a liquid crystal light valve does not suffer from irregularities in thickness and can be constructed with utmost ease. Such an advantage is very important for an optically writing device prepared in accordance with the present invention.

The liquid crystal optical devices in accordance with the present invention include: (i) a liquid crystal composition; (ii) a liquid crystal panel; and (iii) a system for driving the liquid crystal. Details are as follows:

(i) The liquid crystal composition comprises (a) an optically active nematic liquid crystal, or an optically inactive nematic liquid crystal rendered optically active by the addition of an optically active material, and (b) such a nematic liquid crystal has a characteristic such that dielectric relaxation is produced in the direction of the major axes of liquid crystal molecules and dielectric anisotropy is reversible, the dielectric anisotropy having a frequency characteristic which is the same as that shown in FIG. 4;

(ii) The liquid crystal panel includes (a) the liquid crystal composition sandwiched between two transparent base plates and sealed by a sealant, (b) the two base plates each having at least one electrode disposed thereon, the electrodes extending in crossing and confronting relation to each other and the confronting parts being transparent for use as a display or light valve, (c) the two base plates having their surfaces treated for parallel molecular orientation at the surfaces, and (e) polarizes are disposed one on each side of the two base plates so that the polarizing planes extend perpendicularly to each other; and (iii) The liquid crystal driving system selectively applies signals of fl and fh between the electrodes to change liquid crystal molecular orientations, the arrangement being that the two molecular orientations and polarizes are combined to block and transmit light.

The following are the advantages gained by combining crossed polarizers and a nematic liquid crystal composition which is optically active and capable of exhibiting dielectric relaxation in the direction of the major axes of the liquid crystal molecules for realizing a highly advantageous high-speed responsiveness characteristic according to the present invention. The following refers to Liquid Crystal-I of Table I above.

To this liquid crystal composition is added 3 percent by weight of 4-(2-methylbutyl)-4'-cyanobiphenyls (liquid crystal CB-15 manufactured by Merck & Co., Inc.) which is an optically active material known as a chiral nematic liquid crystal to produce a liquid crystal composition (hereinafter referred to as "Liquid Crystal-II"), and is added 3 percent by weight of 4-n-amyl-4'-cyanobiphenyls which is an optically inactive nematic liquid crystal (hereinafter referred to as "Liquid Crystal-III"). The frequency characteristics of the dielectric anisotropy of these liquid crystal compositions are shown in FIG. 16 at (b). The difference between the dielectric anisotroies and frequency characteristics of Liquid Crystal-II and Liquid Crystal III is within measurement errors, and is negligibly small.

While both of the cyanobiphenyl liquid crystals have an alkyl group comprising five carbons, the CB-15 has an asymmetric carbon and hence is optically inactive. Accordingly, Liquid Crystal-II with the 4-(2-methylbutyl)-4'-cyanobiphenyls liquid crystal added is optically active, and Liquid Crystal-III with the 4-n-amyl-4'-cyanobiphenyls liquid crystal added is optically inactive. Liquid Crystal II with the optically active material added is in the helical cholesteric liquid crystal phase with an intrinsic helical pitch being about 4 μm at room temperatures. The intrinsic pitch is defined in the description such that one pitch is given by a 360° rotation.

Figure 21:
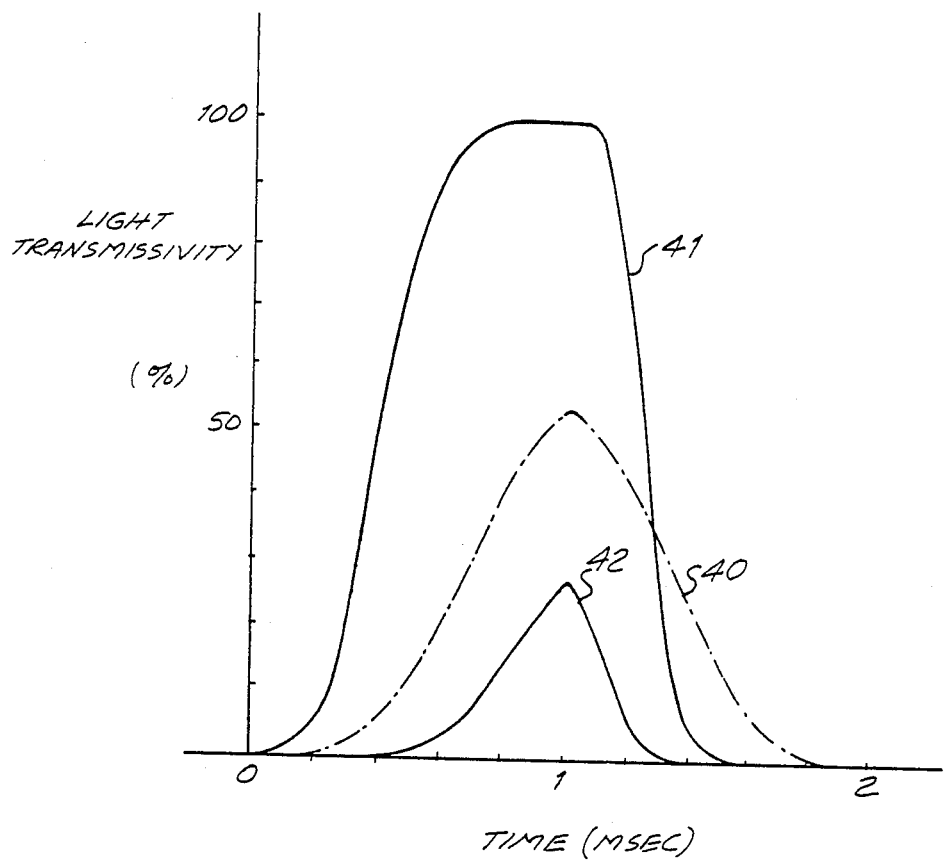
FIGS. 21 and 22 are graphs of responsiveness characteristics of liquid crystal optical devices of the present invention.
Figure 23:
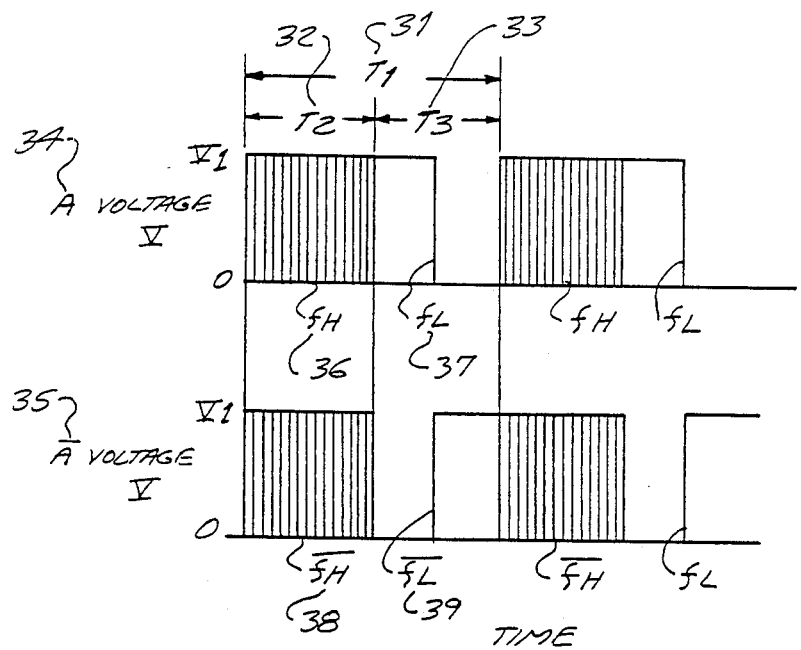
FIG. 23 shows liquid crystal driving signals.

FIG. 21 shows the responsiveness characteristic of light transmissivity of the foregoing liquid crystal compositions sealed in the liquid crystal panel of FIG. 1. FIG. 23 illustrates the driving signals applied to the liquid crystal materials. A signal 34 which is defined as A and a signal 35 which is defined at $\overline{A}$ are applied to the opposite electrodes, A and $\overline{A}$ denoting rectangular waves of opposite phases. Designated at T2 (32) and T3 (33) are intervals of time in which opening and closing signals are applied, respectively, and such intervals of time are contained in a period of time T1 (31) and are repeated. T1 being referred to as writing synchronization. In T2 are applied signals fh indicated at 36, 38 in opposite phases, and in T3 are applied signals fl indicated at 37 and 39 in opposite phases. When the signals a and $\overline{A}$ are applied between the confronting electrodes, signals +V1 and −V1 are applied across the liquid crystal layer.

In FIG. 21, designated at 41, 41 and 42 are characteristic curves of responsiveness of Liquid Crystal-I, Liquid Crystal-II and Liquid Crystal-III. The measurement was made of the liquid crystals having a thickness of 5 to 5.5 μm at a temperature of 40° C. with T1=2 m sec., T2=1 m sec., T3=1 m sec., fh=130 KHz, fl=1 KHz and V1=30 (v). Addition of an optically active material to Liquid Crystal-I changes curve 40 into the curve 41 of Liquid Crystal-II. It is apparent from comparison with the curve 42 of Liquid Crystal-III that addition of the optical material makes such a difference in responsiveness. The responsiveness curve 42 of Liquid Crystal-III is slower than the responsiveness curve 40 due to a reduced ΔεH as shown by the dielectric anisotropy as shown in FIG. 16.

The above measurement data provide the following important result. Addition of an optically active material greatly improves the responsiveness characteristic, and this results from the fact that the liquid crystal composition itself is optically active. More specifically, the difference in responsiveness between Liquid Crystal-II and Liquid Crystal-III which have the same dielectric anisotropy results from the fact that the former is optically active and the latter is optically inactive. Incidentally, Liquid Crystal-III has a liquid crystal layer twisted 90° due to orientation treatment of the liquid crystal panel, and Liquid Crystal-II has a 450°-twisted structure due to the orientation treatment, intrinsic helical construction and thickness of the liquid crystal layer.

Figure 22:
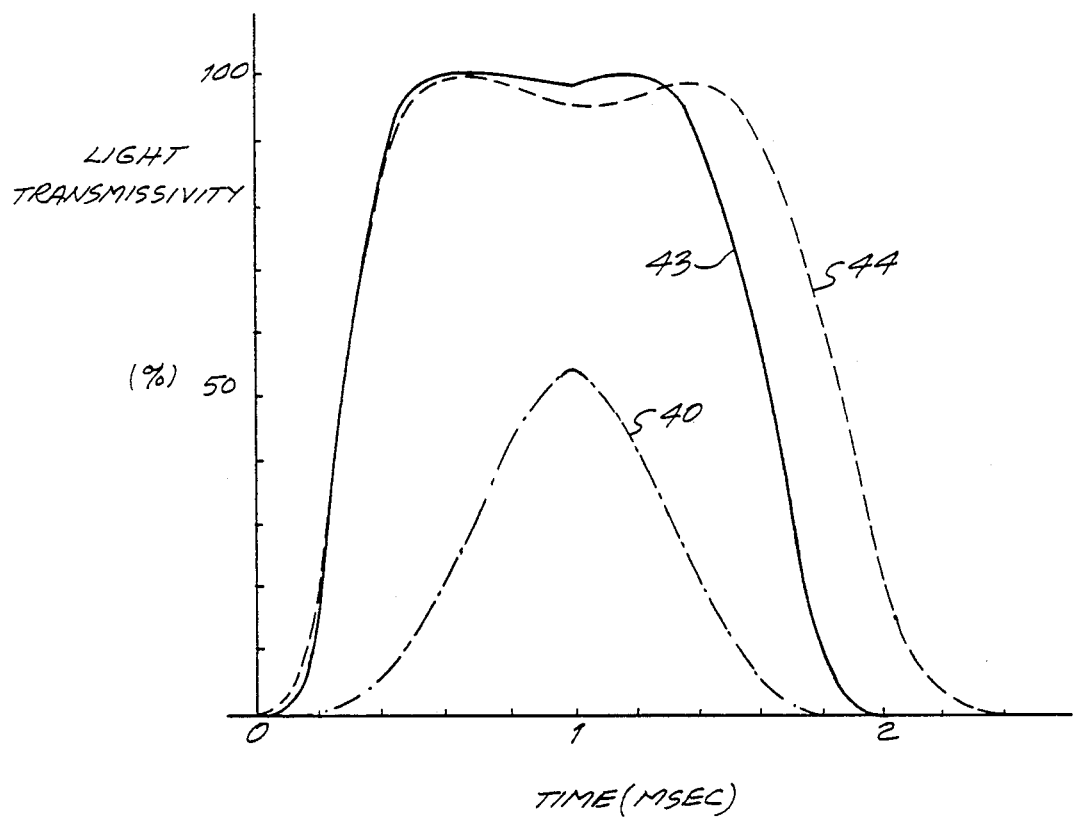

The responsiveness characteristics shown in FIG. 22 will be utilized to explain that being optically active is the governing factor, irrespective of the kinds of optically active materials used. To Liquid Crystal-I were added 2.2 percent by weight of optically active materials, that is, a chiral nematic liquid crystal, 4-(4-hexyloxybenzoloxy)-benzoic acid-d-2-octyl ester (liquid crystal compound S811 manufactured by Merck & Co., Inc.) and a cholesteric liquid crystal, cholesteryl nonanoate ($CH_3(CH_2)_7COOC_{27}H_{45}$) to produce liquid crystal compositions, referred to as Liquid Crystal-IV and Liquid Crystal-V, respectively. The frequency characteristics of dielectric anisotropy of these liquid crystals coincide with that of Liquid Crystal-I as shown in FIG. 16 at (a). Both of Liquid Crystal-IV and Liquid Crystal-V have an intrinsic pitch which is about 4 μm at room temperatures. In FIG. 22 Liquid Crystal-I has a responsiveness characteristic indicated by curve 40, Liquid Crystal-IV has a responsiveness characteristic indicated by the curve 43 and Liquid Crystal-V has a responsiveness characteristic indicated by the curve 44. The measurements were made for a liquid crystal layer having a thickness of 5 to 5.5 μm at a temperature of 40° C. with T1=3 m sec., T2=2 m sec., T3=1 m sec., fh=130 KHz, fl=1 KHz and V1=30(v). FIG. 22 indicates that Liquid Crystal-IV and Liquid Crystal-V have greatly improved responsiveness characteristics. The results show that the improved responsiveness characteristics do not depend on the particular optically active materials added.

Figure 26:
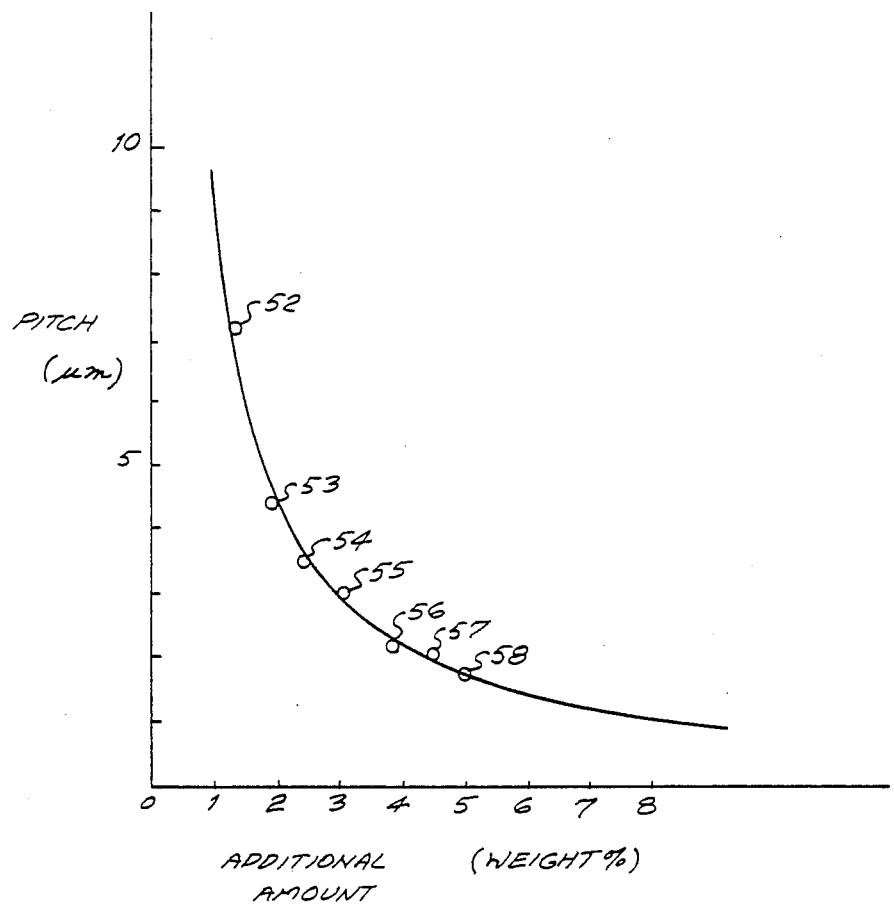
FIG. 26 is a graph showing the pitch of a liquid crystal composition as it varies with the amount of an optically active material added.

The present invention is not dependent on the amount of an optically active material added, but on relationship between the helical pitch of a liquid crystal layer generated by the added optically active material and the thickness of the liquid crystal layer. How the amount of the optically active material added affects the responsiveness characteristic will now be described. FIG. 26 shows the relationship between the helical pitch and the amount of the chiral nematic liquid crystal, that is, 4-(4-hexyloxybenzoloxy)-benzoic acid-d-2-octyl ester added to a liquid crystal composition (hereinafter referred to as "Liquid Crystal-VI" given in Table 2.

TABLE II
| Compounds | Percentage of mixture (wt %) |
|---|---|
| 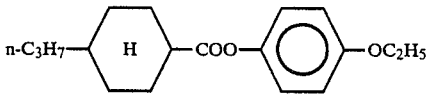 | 5 |
| 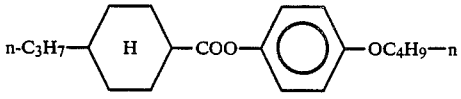 | 17 |
| 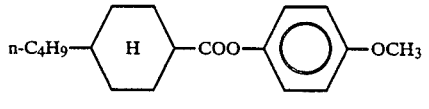 | 14 |
| 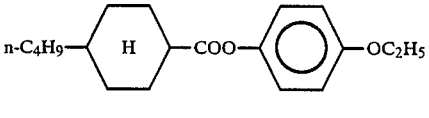 | 17 |
| 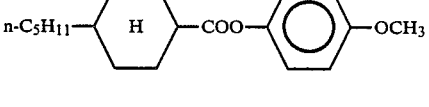 | 17 |
| 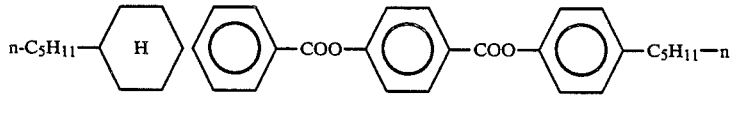 | 6 |
| 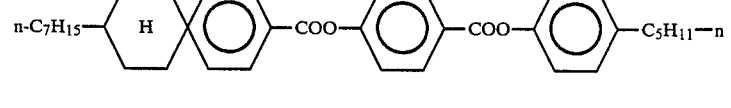 | 6 |
| 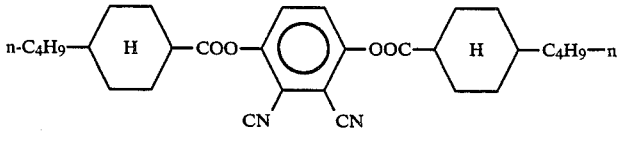 | 2 |
| 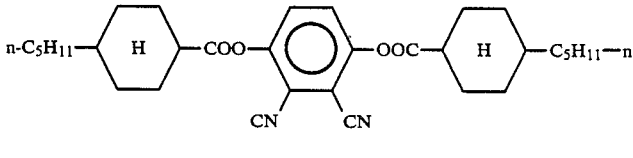 | 2 |
| 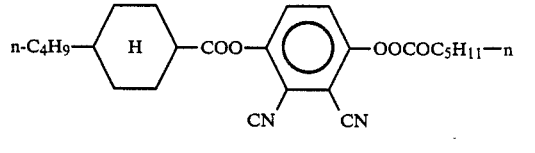 | 4 |
| 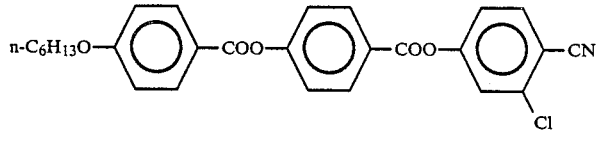 | 6 |

TABLE II-continued

| Compounds | Percentage of mixture (wt %) |
|---|---|
| n-C$_8$H$_{17}$O—⬡—COO—⬡—COO—⬡(Cl)—CN | 4 |

Referring to FIG. 26, 52 to 58, inclusive, are points of measurement at room temperature. Addition of the chiral nematic liquid crystal to Liquid Crystal-VI does not substantially change dielectric anisotropy and its frequency characteristic. Thus, copmarison of the responsiveness characteristic with respect to the amount of the added liquid crystal is equivalent to the; and responsiveness characteristic with respect to one variable, namely, the "pitch". Data points 52 to 58 in FIG. 26 represent pitches given when 1.3, 2.0, 2.5, 3.1, 3.4, 4.5 and 5.0 percent by weight of the liquid crystal are added, respectively. Responsiveness characteristics at this time are shown in FIGS. 24 and 25 by curves 60 to 68.

Curves 60 and 61 represent responsiveness characteristics obtained when 0 and 0.5 percent by weight, respectively, of the liquid crystal are added. The curves 62 and 65 correspond respectively to data points 52 to 58 of FIG. 26. These measurements were made of the liquid crystals sealed in a liquid crystal panel as shown in FIG. 1. The panel has a thickness ranging from 5 to 5.5 μm at a temperature of 40° C. with T1=2 m sec., T2=0.5 m sec., T3=1.5 m sec., fh=130 KHz, fl=1 KHz, V1=30(V). The direction of rubbing corresponding to that indicated by arrow 5 in FIG. 1, however, the rubbing is in a direction opposite to the direction of arrow 5 of FIG. 1.

Figure 24:
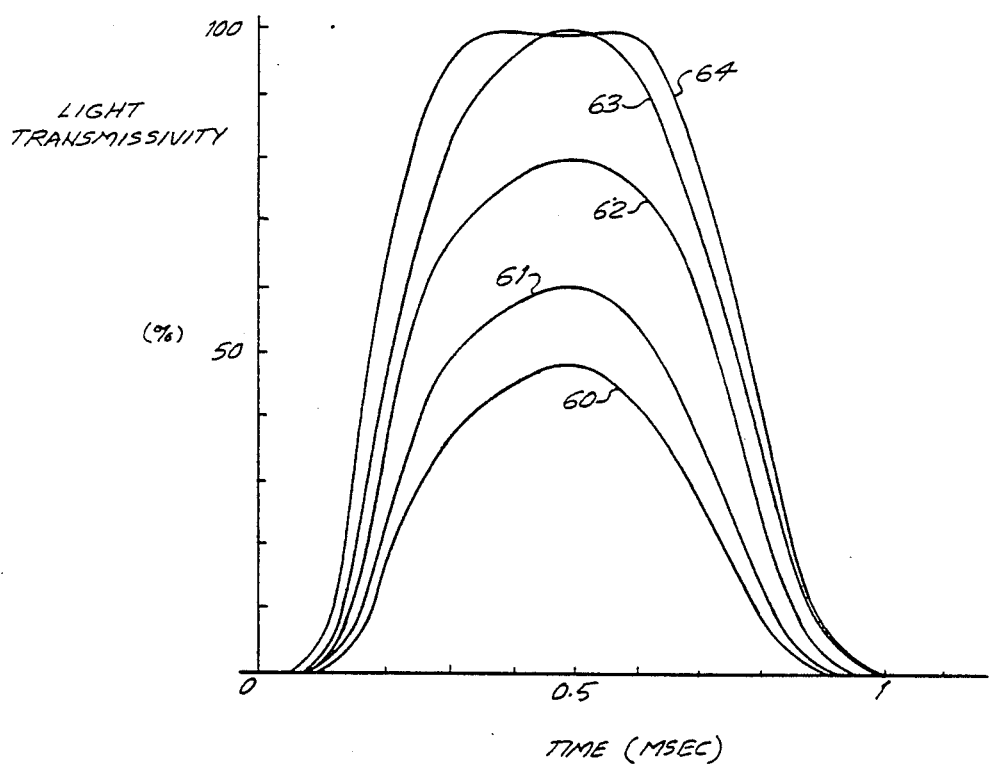
FIGS. 24 and 25 are graphs of responsiveness characteristics of liquid crystal optical devices of the present invention.
Figure 25:
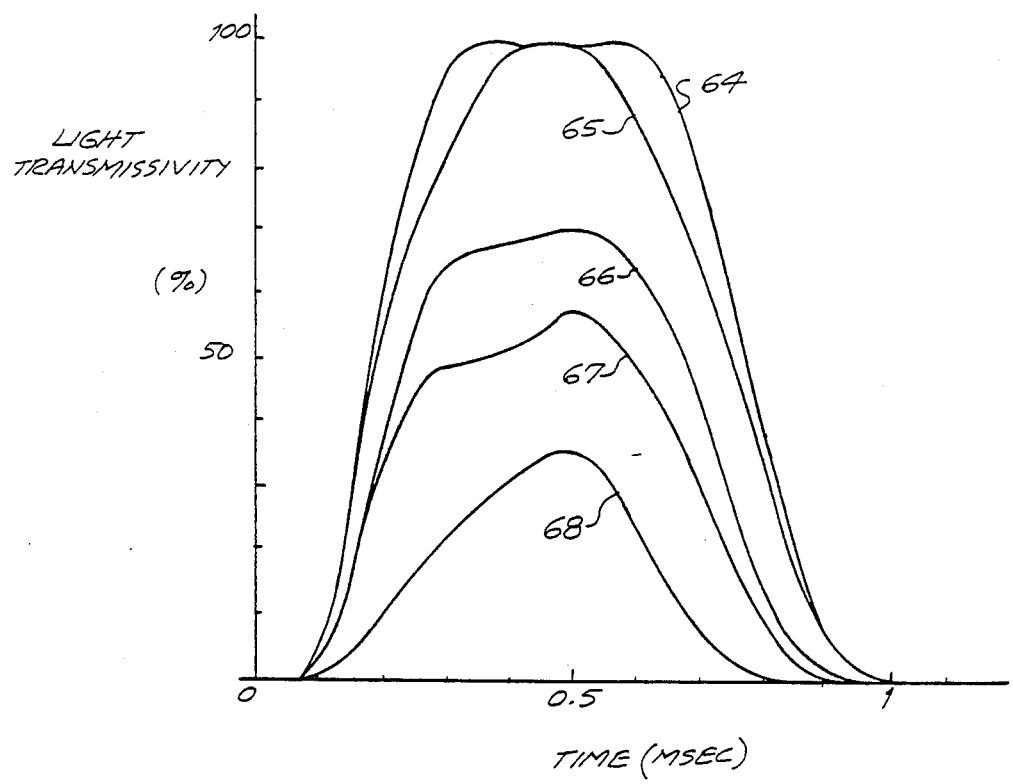

A review of FIGS. 24 and 25 indicates that there is an optimum amount of the optically active material which may be added. Additionally, an excessive amount of optically active material added causes responsiveness to become slower than the responsiveness without optically active material added. With the thickness of the liquid crystal layers being between 5 to 5.5 μm and at a temperature of 40° C., angles of twist of the liquid crystal layers are 90° for curves 60 and 61 in FIGS. 24 and 25, 270° for curve 62, 450° for curves 63 and 64, 630° for curve 65, 810° for curves 66 and 67 and 990° for curve 68. When the liquid crystal layer has a structure twisted through substantially three rotations, no further advantage can be gained by adding more optically active material. Although the liquid crystal layer about 5 μm thick has been described, substantially the same result about twisting can be obtained irrespective of the thickness of liquid crystal layers.

As described above, it is possible to provide a high-speed light valve by using a liquid crystal composition comprising a nematic liquid crystal capable of producing dielectric relaxation in the direction of major axes of liquid crystal molecules with an optically active material added to the nematic liquid crystal and by applying signals of fh and fl.

Driving signals which render the present invention more effective will now be described. The following measurements were made with a liquid crystal composition (hereinafter referred to as "Liquid Crystal-VII". Liquid Crystal-VII was prepared by adding 2.2 percent by weight of 4-(4-hexyloxybenzoloxy)-benzoic acid-d-2-octyl ester to a nematic liquid crystal composition hereinafter referred to as "Liquid Crystal-VIII" as shown in Table III. The liquid crystal composition was measured at a temperature of 40° C. for liquid crystal layer thicknesses of 5 to 5.5 μm, with fh=130 KHz, fl=500 KHz or 1 KHz.

Figure 27:
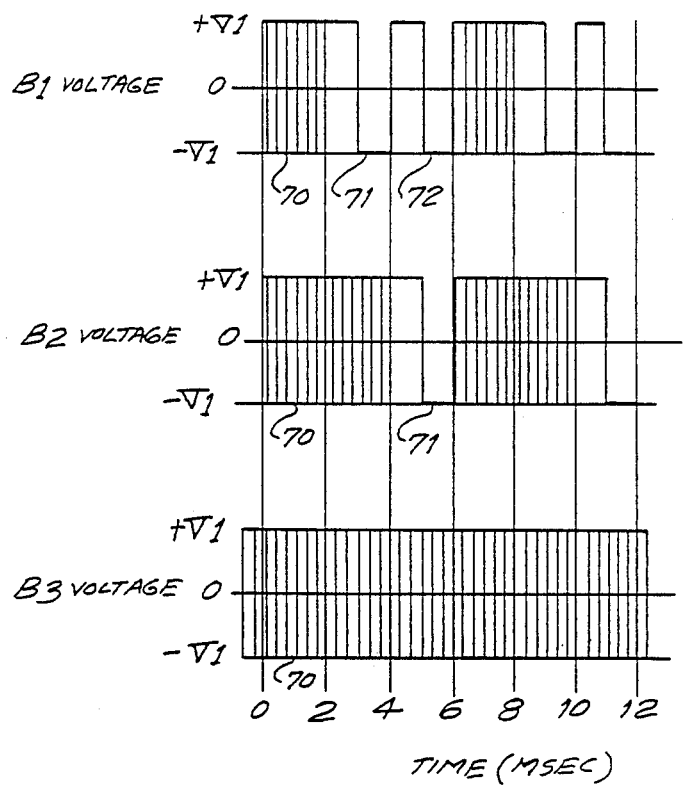
FIGS. 27, 28 and 29 are graphs illustrating liquid crystal driving signals in accordance with the invention.

FIG. 27 shows by way of example, signals applied for opening and closing a liquid crystal light valve once every 2 m sec. Designated as 70 is a signal of fh, and as 71 is a signal of fl. At B1, the signal of fh is applied for 2 m sec., and the signal of fl is applied for 4 m sec. At B2, the signal of fh is applied for 4 m sec., and the signal of fl is applied for 2 m sec. At B3, the signal of fh is applied for 6 m sec.

TABLE III

| Compounds | Percentage of mixture (wt %) |
|---|---|
| n-C$_3$H$_7$—⬡(H)—COO—⬡—OC$_2$H$_5$ | 5 |
| n-C$_3$H$_7$—⬡(H)—COO—⬡—OC$_4$H$_9$—n | 15 |
| n-C$_4$H$_9$—⬡(H)—COO—⬡—OCH$_3$ | 13 |

TABLE III-continued
| Compounds | Percentage of mixture (wt %) |
|---|---|
| 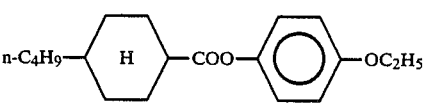 | 13 |
| 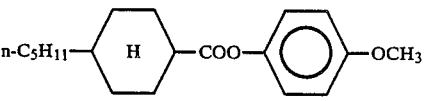 | 14 |
| 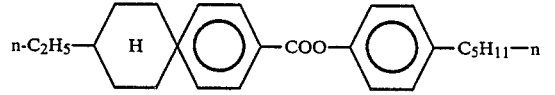 | 4 |
| 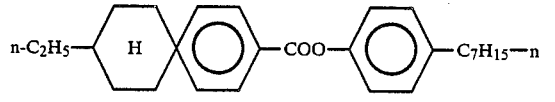 | 18 |
| 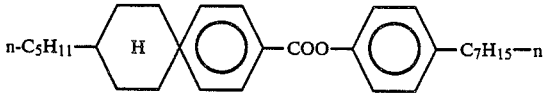 | 7 |
| 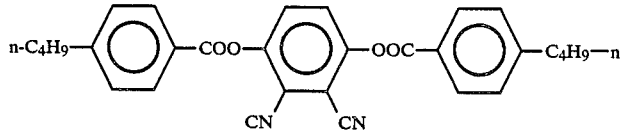 | 3 |
| 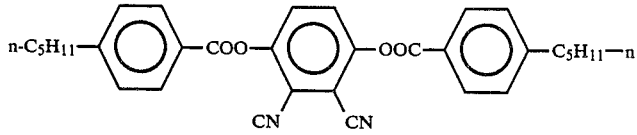 | 2 |
| 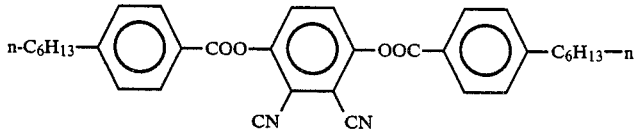 | 1 |
| 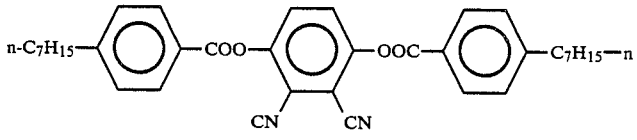 | 1 |
| 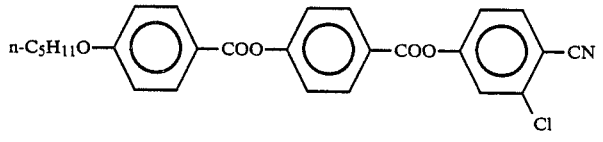 | 2 |
| 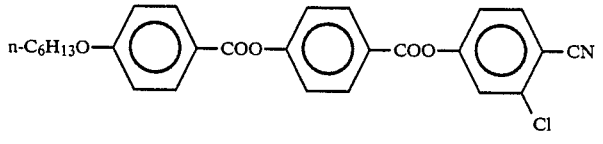 | 7 |

TABLE III-continued

| Compounds | Percentage of mixture (wt %) |
|---|---|
| n-C$_8$H$_{17}$O—⟨⟩—COO—⟨⟩—COO—⟨⟩(Cl)—CN | 3 |

Figure 30:
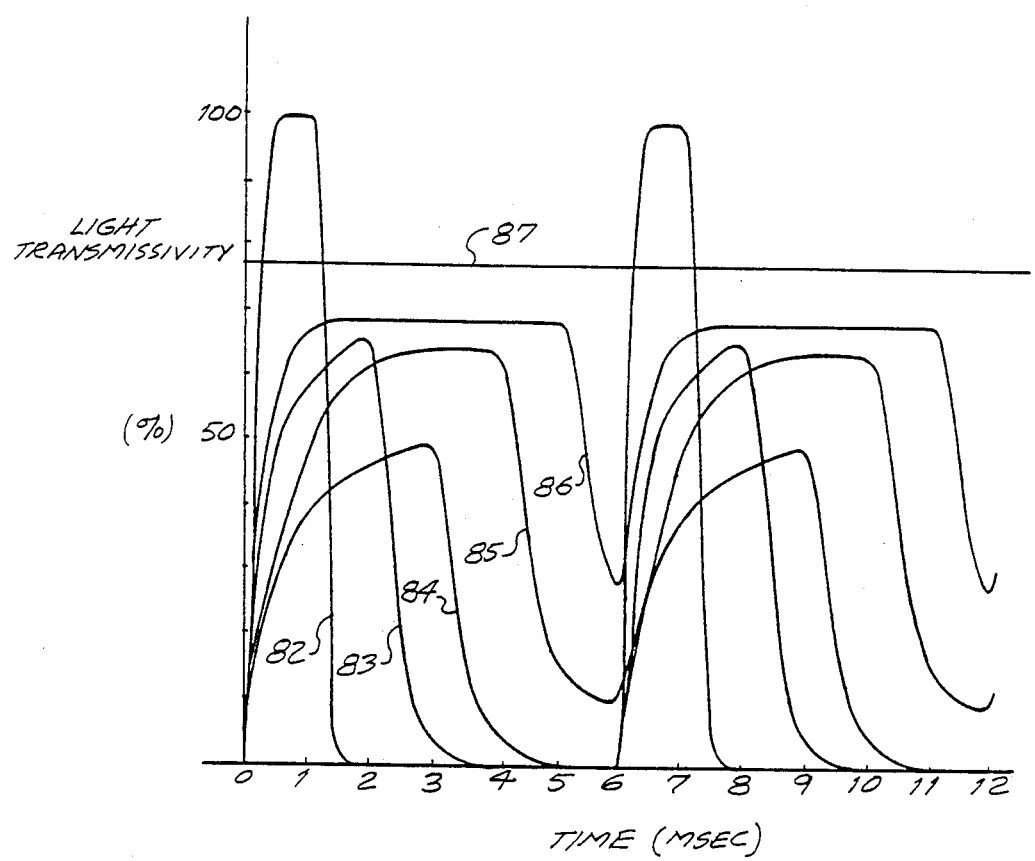
FIGS. 30, 31 and 32 are graphs showing the responsiveness characteristics of a liquid crystal composition.

The signals B1, B2 and B3 are repeatedly applied to the liquid crystal. These signals are applied to one of the electrodes, and a signal of 0(v) is applied to the other electrodes, V1 being 30(V). The responsiveness characteristics are illustrated in FIG. 30. The responsiveness characteristics represented by curves 83, 85 and 87 correspond respectively to the light transmissivity response to application of signals B1, B2 and B3 of FIG. 27. The responsiveness characteristics represented by curves 82, 84 and 86 correspond to transmissivity in response to repeated signals in which signals of fh are applied for 1 m sec., 3 m sec., and 5 m sec., respectively, and signals of fl are applied for 5 m sec., 3 m sec., and 1 m sec., respectively. As is apparent from FIG. 30, responsiveness characteristics are different with respect to all of the applied signals. Thus, the light transmissivity varies with the applied signals.

Figure 28:
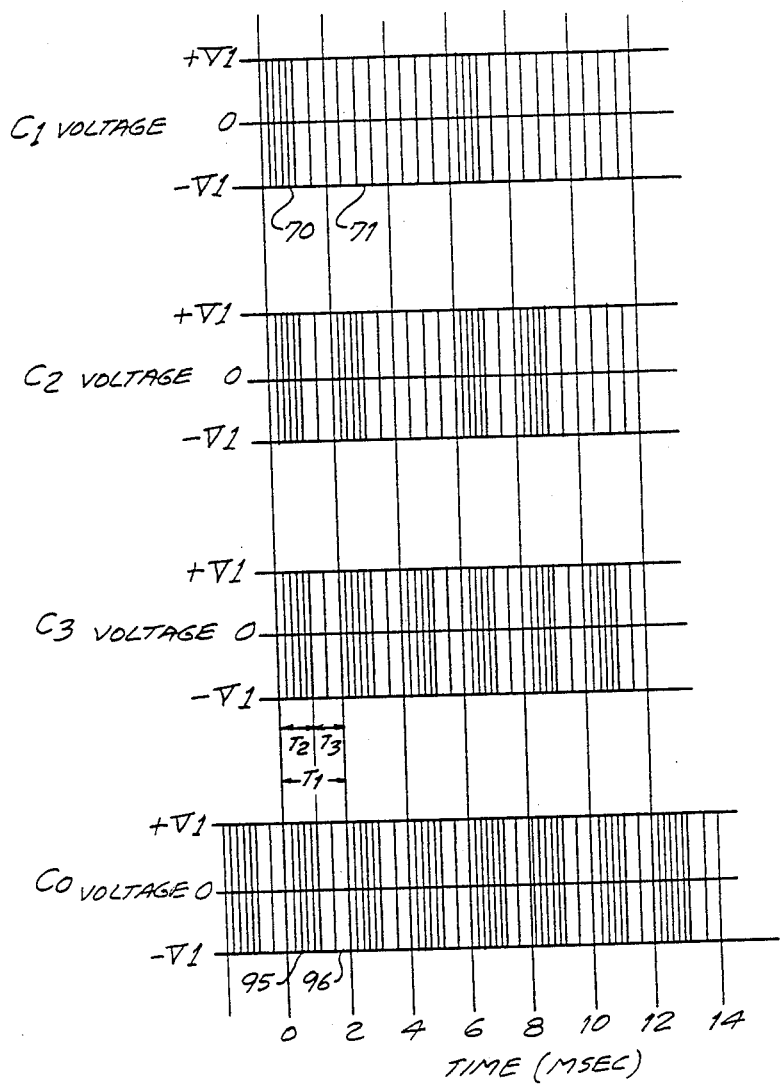

FIG. 28 illustrates the waveforms of examples of signals applied in accordance with the present inventioin. Signals C1, C2 and C3 correspond respectively to the signals B1, B2 and B3 of FIG. 27. The examples of signals of FIG. 27 differ from those of FIG. 28 in that the repetitive period T1 is divided into T2 and T3 in FIG. 28, with the signal of fh applied in T2 and the signal of fl applied in T3. In the examples of FIG. 27, the opening signal is fh only, whereas the present invention utilizes a unit of combined signals of fh and fl. The closing signal is of fl in both T2 and T3.

Figure 31:
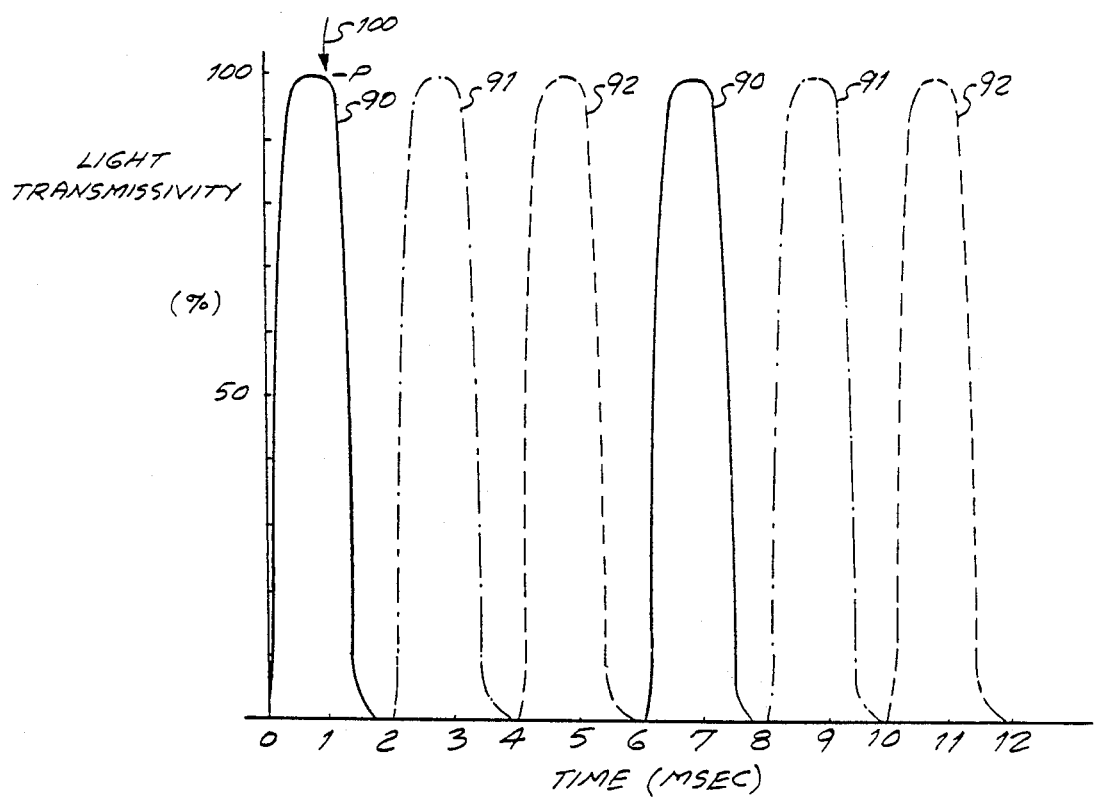

FIG. 31 shows responsiveness characteristics obtained when the signals C1 and C3 are applied to one of the electrodes of the optical device while a signal of 0(V) is applied to the other electrode with V1=30(V). Designated as 90 is the responsiveness characteristics for C1, 90 and 91 for C2, 90, 91 and 92 for C3. These responsiveness characteristics are the same as the responsiveness characteristic 87 of FIG. 30. The characteristics shown in FIG. 31 are highly advantageous in that they permit high speed operation, and uniformly provide the same light transmissivity. Obtaining the foregoing characteristics and reducing the voltage in half can be achieved by a system for applying a signal shown by waveform CO in FIG. 28 to the electrode to which the voltage of 0(V) is applied. Curve 95 and 96 represent signals of fh and fl, respectively, the signals being in opposite phase with the signals 70 and 71. The signal CO is in opposite phase with the signal C3. Opening and closing signals are the same as the signals C1 to C3. In order to obtain the characteristics of FIG. 31, V1 may be 15(V) or the amplitude between +V1 and −V1 as shown in FIG. 28 may be changed into an amplitude between 0 and +V1.

Figure 29:
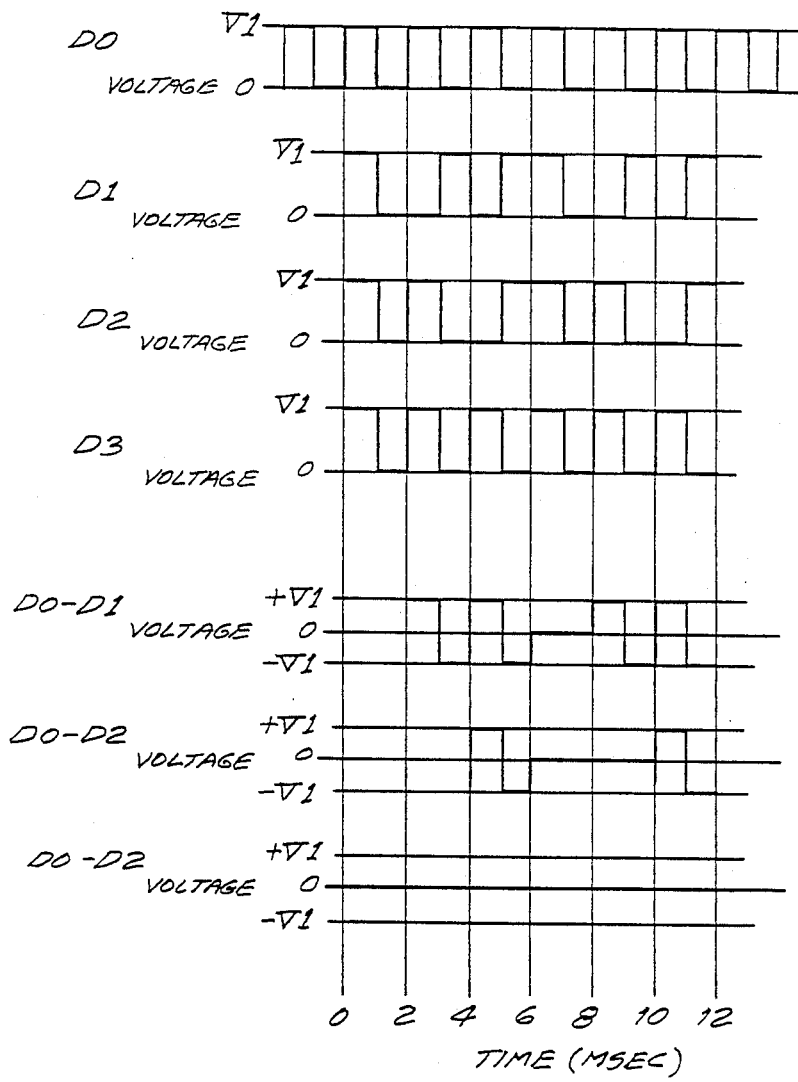
Figure 32:
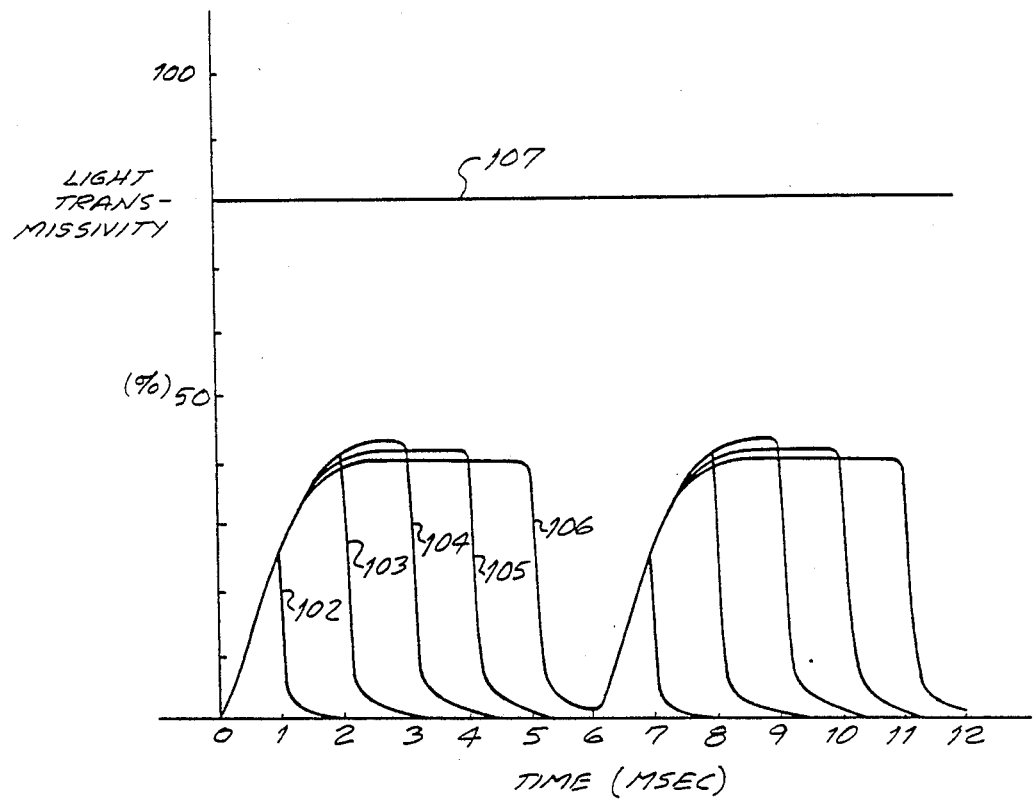

The effectiveness of the driving system employing a liquid crystal composition capable of producing dielectric distribution, and of opening and closing by switching between the frequencies fl and fh will be described again, and the features of the present invention will be described. Conventional signals for driving a liquid crystal as shown in FIG. 29 are applied to the foregoing liquid crystal light valve. Designated at D1, D2 and D3 are opening and closing signals corresponding respectively to C1, C2 and C3 of FIG. 28. The signals D1, D2 and D3 are applied to one of the electrodes, and the signal D0 is applied to the opposite electrode. The opening signals at D1, D2 and D3 are in phase with the signal D0 and the closing signals are in opposite phase with the signal D0. Thus, the signals D0–D1, D0–D2 and D0–D3 are applied across the liquid crystal layer. FIG. 32 shows the responsiveness characteristics corresponding to application of these signals. The characteristic curves 103, 105 and 107 correspond respectively to the signals D1, D2 and D3. The curves 102, 104 and 106 are indicative of signals in which intervals of time during which they are in phase are 1 m sec., 3 m sec. and 5 m sec., respectively.

These measurements were obtained under the same conditions as those for the measurements of FIGS. 30 and 31. The same liquid crystal material was used, and V1 was 30(V). The examples shown in FIG. 32 are different from the present invention shown in FIG. 31 in that an applied signal of fh was not used. The examples of FIG. 32 are characterized in that they have a fast responsiveness characteristics, while when the conventional drive signals as shown in FIG. 29 are applied to ordinary twisted nematic liquid crystal elements, they respond with transmitted light under the mean effective voltage as with the examples described in connection with FIG. 2. This is due to the optically active material added. High-speed response could likewise be obtained by E24LV used for the measurement of FIG. 2 to which an optically active material was added. However, the light transmissivity is low as shown in FIG. 32.

In accordance with the present invention, a liquid crystal light valve can be provided which will operate at a higher speed and which will provide higher light transmissivity. It should also be noted that although addition of an optically active material reduces the pitch of the liquid crystal, resulting in optical rotatory dispersion and a reduction in the light transmissivity when no voltage is applied, light transmissivity of 100% can be obtained by applying a signal of fh. FIGS. 30, 31 and 32 show responsiveness characteristics of the same liquid crystal panel. While the light transmissivity when no voltage is applied is 81% as shown at 107, the light transmissivity according to the present invention reaches 100%. The reason why this happens is still under study.

An important thing about the driving signals according to the present invention is that the signals of fl are required to be applied in a given period (T1). Application of the signals of fl causes the major axes of the liquid crystal molecules to be oriented in a quasi-stable state perpendicular to the surfaces of the panel base plates, resulting in a high-speed response capability. Measurements indicative of advantages of applying the signals of fl and applications will be described. The responsiveness characteristic shown in FIG. 31 are available when the driving signals are applied continuously. The responsiveness characteristic obtained when the applied voltage is raised from 0(V) to V1 for operation until a stable response is reached will be described for an application (Example 1) to be described below.

FIGS. 33, 34, 35 and 36 illustrate light transmissivity P indicated by the arrow 100 in FIG. 31 as it varies with time. For the example of FIG. 33, a liquid crystal panel having a liquid crystal layer 5.3 μm thick was used. For the examples of FIGS. 34, 35 and 36, a liquid crystal panel having a liquid crystal layer 6.5 μm thick was used. The liquid crystal panel with a liquid crystal layer 5.3 μm thick of FIG. 33 has liquid crystal molecules twisted through an angle of 450°. With a liquid crystal layer 6.5 μm thick of FIGS. 34, 35 and 36 the liquid crystal molecules are twisted through 630°.

Figure 33:
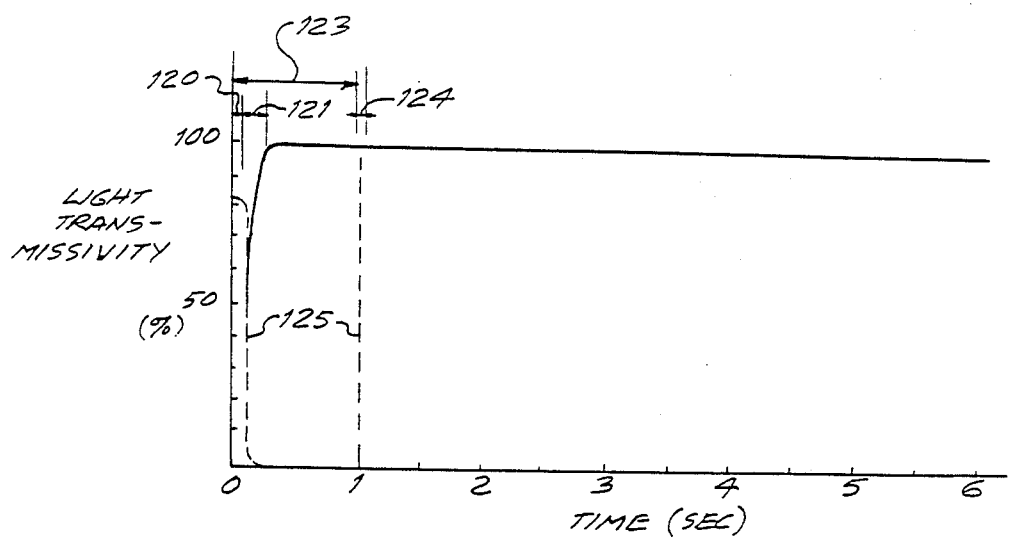
FIGS. 33, 34, 35 and 36 are graphs showing the stability characteristics of liquid crystal compositions.

In FIG. 33 which indicates data on the liquid crystal panel with molecules twisted through 450° will be described. Designated as 120 is an interval of time between turning on of a power supply switch and generation of a voltage, and as 121 is an interval of time required until a responsiveness characteristic becomes stabilized. The interval of time 121 is about 200 m sec. Once the responsiveness characteristic is stabilized, such a stable condition continues. During an interval of time indicated at 123, a light transmission characteristic shown by the broken lines 140 results when the signals of FIG. 28 are applied after only the signal of fl has been applied for one second. Such a characteristic becomes stable in a time interval 124 which ranges from 10 to 20 m sec. Application of the signal of fl can render the operation stable more quickly.

Figure 34:
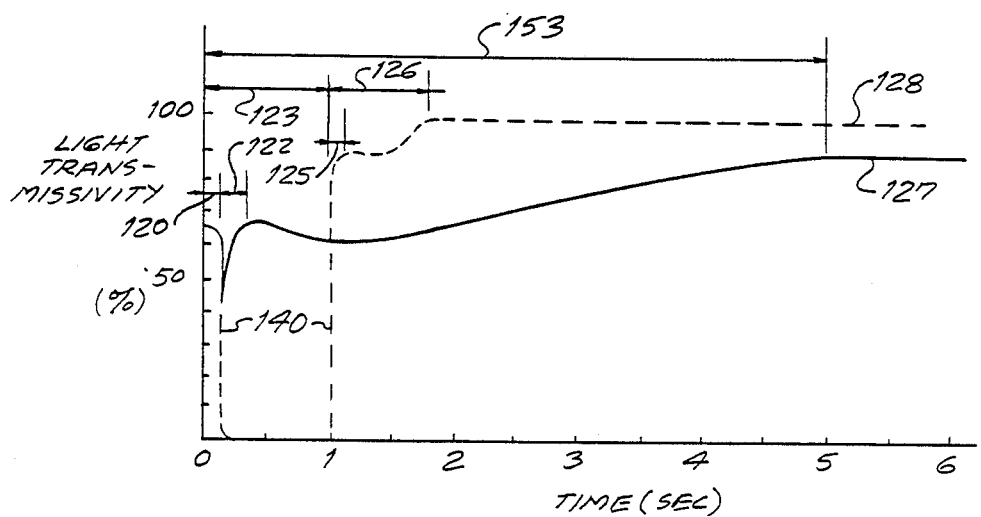

The liquid crystal panel with liquid crystal molecules twisted 630° will be described with reference to FIG. 34. The measurements were made under the same conditions as those for FIG. 33. An interval of time designated as 122 is required until a responsiveness characteristic becomes substantially constant, the interval of time being about 300 m sec. The light transmissivity is low. Designated at 153 is an interval of time, which is about 5 seconds, required until the transmissivity becomes continuously constant. The continuously constant transmissivity does not reach 100%, but is 90% in the example of FIG. 34. However, when the operating signals are applied after the signal of fl has been applied for an interval of time (one second) indicated at 123, the transmissivity changes as shown by the broken line and reaches 100% when it becomes stable at 128. The transmissivity as shown by the broken line changes such that it rapidly rises in a period of time 125 and becomes stable in a period of time 126 (on the order of one second). The phenomenon is considered to be a quasi-stable condition gained by application of the signal of fl.

Figure 35:
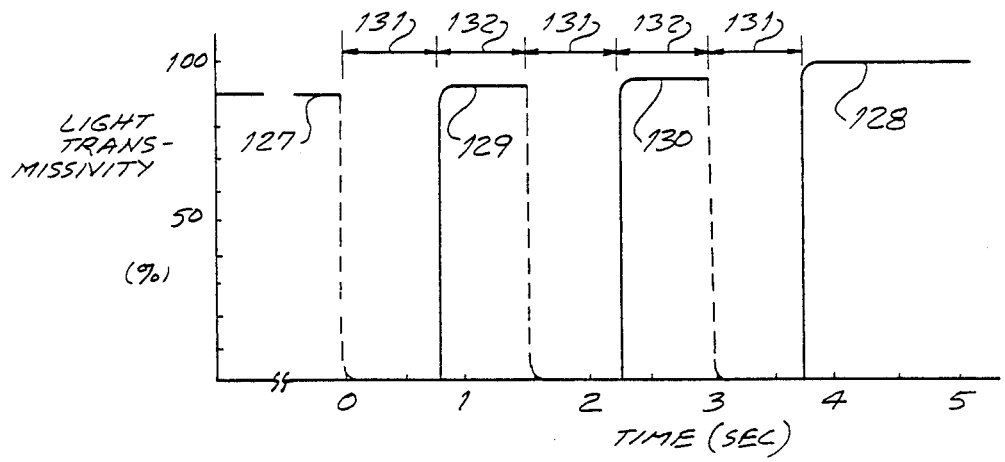
Figure 36:
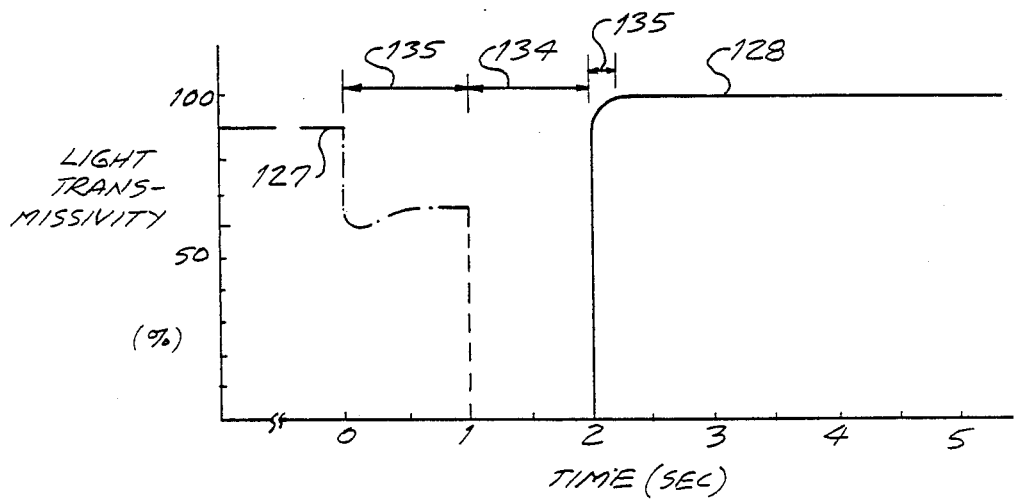

According to the example shown in FIG. 35, a signal of fl is applied for an interval of time 131 (0.75 sec.) after the transmissivity of 90% has been stabilized at 127, and then the operating signals are applied for an interval of time 132 (0.75 sec.), the signals being applied repeatedly. The transmissivity gradually increased as indicated at 127, 129, 130, 128 until it reached 100%. In another example of FIG. 36, a signal of 0(V) is applied for an interval of time 133 (one second) and then the signal of fl is applied for an interval of time 134 (one second) after the transmissivity of 90% has been stabilized at 127, and thereafter the operating signals are applied. The transmissivity is restored in a period of time 135 up to 100%. As described above, the stable operating condition can be reached in a short period of time by applying the signal of fl, a feature which is important in practice because application of the signal of fl can prevent a drop in the transmissivity as described above which would otherwise be caused by irregularities in the thickness of the liquid crystal panel occuring in the manufacturing process. As described in the foregoing examples, the present invention provides a display device and light valve which will operate at high speeds and respond rapidly by employing a liquid crystal composition panel and a system for driving the panel. Embodiments in which the liquid crystal optical device is incorporated will be described.

EXAMPLE 1

Figure 37:
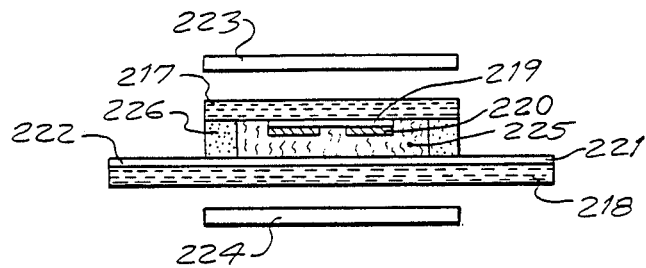
FIG. 37 is a cross-section view of a liquid crystal panel in accordance with a further embodiment of the pesent invention.
Figure 38:
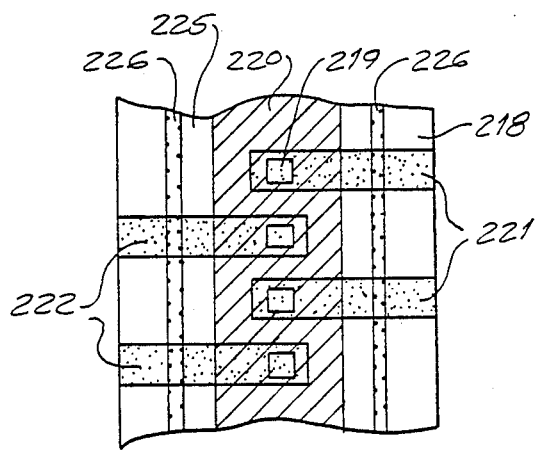
FIG. 38 is a top plan view of the liquid crystal panel of FIG. 37.

An embodiment will first be described which embodies the present invention as a microshutter array for photowriting. FIGS. 37 and 38 show the arrangement of a liquid crystal panel. The liquid crystal panel comprises a base plate 217 of glass supporting common signal electrodes 219, 220, a base plate 218 of glass supporting signal electrodes 221, 222, a liquid crystal composition 225 sealed between base plates 217, 218 and spacers 226, and polarizers 223, 224 disposed one on each side of base plates 217 and 218. Common signal electrodes 219 are transparent, common signal electrode 220 is opaque, and signal electrodes 221, 222 are transparent. Polarizers 223, 224 have their polarizing planes extending perpendicularly to each other. Light is modulated by a microshutter composed of transparent common electrodes 219 and signal electrodes 221 and 222. 2,000 in number of such microshutters are arranged in a straight interval of 20 cm, the microshutters being spaced at an interval or pitch of 100 μm. A integrated circuit driver has been fabricated on a trial basis which is capable of opening and closing the microshutters in response to time-series picture-element data, and packaged on the panel. Since one such integrated circuit driver has fifty output drivers, a total of forty such driver ICs have been mounted, twenty on each side of the 2,000 microshutters.

Figure 39:
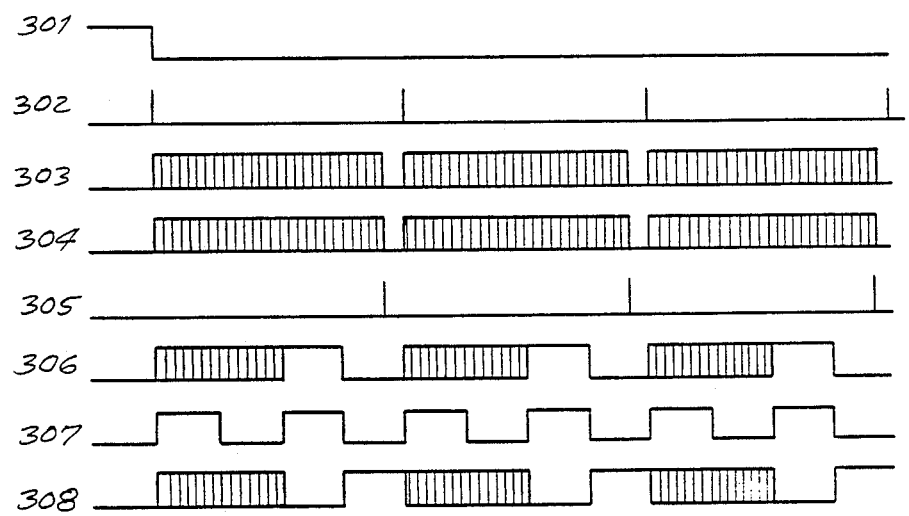
FIG. 39 is a graph of signal waveforms for driving a liquid crystal panel in accordance with the invention.
Figure 40:
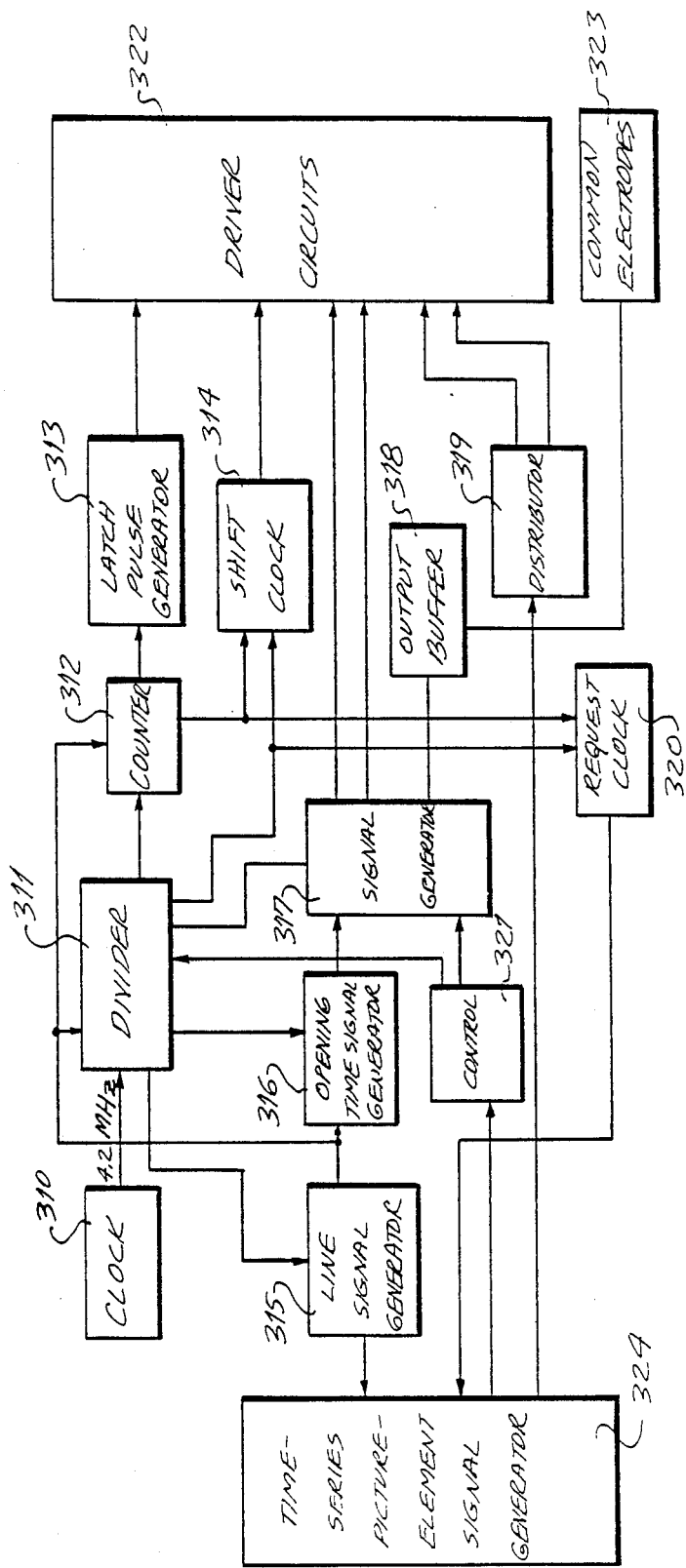
FIG. 40 is a block diagram of a circuit for providing the signals of FIG. 40 in accordance with this embodiment.

FIG. 39 is a timing chart of various signals necessary for driving the panel, and FIG. 40 is a block diagram of a circuit for producing the driving signals. Designated as 301 in FIG. 39 is a reset signal for starting operation, as 302 is a line starting signal indicate of starting of data in one line, and as 303 is a request clock signal for requesting the data. The clock signal comprises 2,000 pulses for one line supplied in synchronism with the line starting signal. The data is received in synchronism with the clock pulses. Designated as 304 is a shift clock signal for transferring data from a shift register in the integrated driving circuits as 305 are latch pulses for latching the data immediately after the data has been transferred, and 306, 307, 308 are driving signals to be applied to the liquid crystal. Signal 308 is to be applied to the common electrodes. When the ON signal 306 is applied, the liquid crystal microshutters are opened, and when the OFF signal 307 is applied, the microshutters are closed. The ON signal and the common electrode signal are composed of combined signals of a high frequency fh and a low frequency fl, and are in opposite phase with each other. The OFF signal is of a low frequency in phase with the ON signal of fl. The interval of time in which the signal of fh is applied in one period of the ON signal is called an opening time. The circuit arrangement for generating these signals comprises a clock generator 310 for producing a base clock signal of 4.2 MHz which is frequency-divided by a divider 311 for generating various signal waveforms. The line starting signal having a period of 2 m sec. is generated at 315 for synchronization. 2,000 pulses are counted at counter 312, and a request signal is generated at request clock 320 and applied together with the line starting signal to a time-series picture-element signal generator 324 which is outside equipment. Data which is supplied from the picture-element signal generator 324 in synchronism with request clock 320 is distributed at 319 for supply to the driver ICs 322 packaged in an inter-digital structure.

The opening time is determined at 316, and the ON signal, OFF signal and common electrode signal are generated at 317. The latch pulses are generated at 313 and the shift clock is generated at 314, these signals and the ON and OFF signal data being supplied to the integrated driver circuits 322. The common electrode signals are converted by an output buffer 318 so as to be as a voltage of 30(V), and are applied to the common electrode 323. A control 321 receives a reset signal from the outside equipment 324 for starting and stopping operation of various circuit components.

Figure 41:
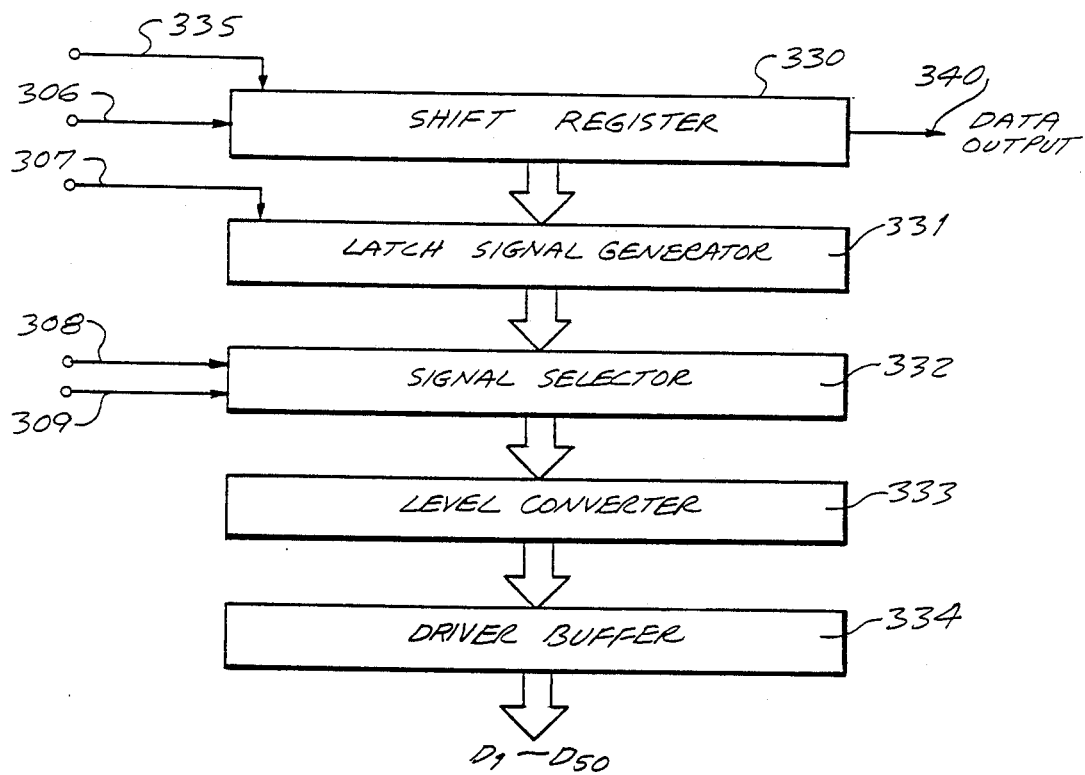
FIG. 41 is a block diagram of an integrated circuit for driving the liquid crystal according to this embodiment.

FIG. 41 is a block diagram of the integrated driver circuit. The data supplied as an input from the foregoing circuit of FIG. 40 is transferred by a shift register 330 of 50 bits in synchronism with a shift clock signal 335. The shift register in the twenty ICs on one side of the panel are connected in cascade. Data from a data output 340 is transferred to the shift register in an adjacent IC driver. When data of 1,000 bits on one side, or of 2,000 bits on both sides of the panel has been transferred, the data is latched by a latch 331 of 50 bits at a timing of the latch pulses 337. ON and OFF signals 338 and 339 are selected one at a time at 332 dependent on the latched data, and the logic level of the selected signal is converted by a lever converter 332 into a signal at a driving voltage of 30(V), which is supplied via a driver buffer 334 to the signal electrodes.

The microshutter array is thus driven. With such an arrangement, a high-speed light valve array is actuatable in 2 m sec. for one line.

Example 2

The microshutter array of Example 1 with Liquid Crystal-VIII sealed in is maintained at 40° C. with T1 being 2 m sec., and T2 being 0.6 m sec. A photosensitive body of zinc oxide sensitized with rose bengal is illuminated by light transmitted through the microshutter array from a halogen lamp with a brightness of 2,000,000 cd/m$^2$ disposed behind the microshutter array, and was developed. An image is formed on the photosensitive array in accordance with signals applied. The photosensitive body is caused to move at a speed of 5 cm/sec. Thus, a high-speed photo-writing printer can be provided.

Example 3

Figure 42:
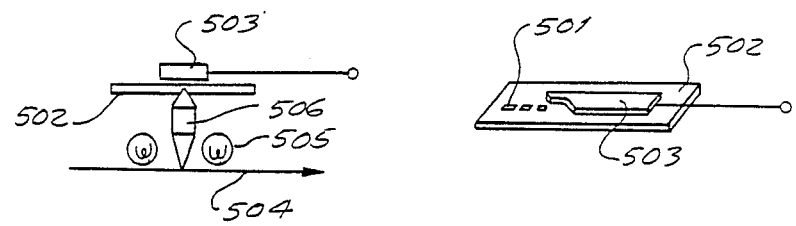
FIGS. 42, 43, 44, 45, 46, 47, 48, 49 and 50 are views showing further embodiments in accordance with the present invention.

As shown in FIG. 42, a photo sensor 503 such as CdS is disposed closely to a liquid crystal optical device 502 of the invention which comprises 500 shutters 501 with 8 dots/mm arranged rectilinearly. Sources of light 505 are disposed adjacent to the surface of an original 504 to be read for illuminating the surface of the original 504, there being a convergent optical fiber element 506. The original 504 is optically read out at a speed of 500 Hz for 8 dots/mm. Since the shutters 501 in the liquid crystal optical device 502 are opened one at a time, the single photosensor 503 may suffice, and hence the device is quite inexpensive to construct.

Example 4

Figure 43:
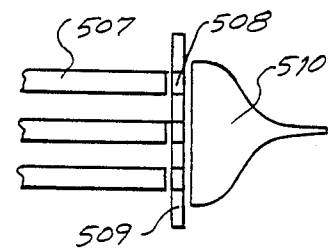

As shown in FIG. 43, a liquid crystal optical device 509 of the present invention has apertures 508 formed correspondingly to a plurality of optical fibers 507. A single optical fiber 510 is disposed in opposite relation to the optical fibers 507 across the liquid crystal optical device 509, the single optical fiber 510 having an end covering all of the apertures. With this arrangement, a photoswitch can be construced which can switch light signals as desired at a speed of 500 Hz.

Example 5

Figure 44:
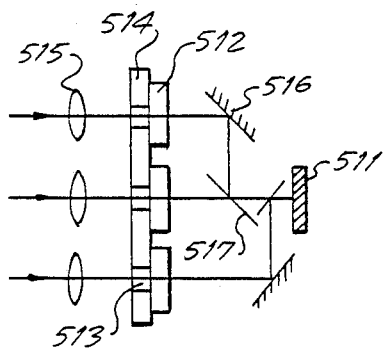

As illustrated in FIG. 44, a liquid crystal optical device 514 according to the present invention is placed in an optical path in front of a single-panel television camera sensor 511, device 514 comprising 37 shutters 513 each having a tri-colored filter 512. With such an arrangement, television signals can be generated which includes color signals with 10 m sec. for each filter and hence 30 m sec. for all filters. Designated as 515 is a lens, as 516 is a mirror, and as 517 is a dichroic mirror.

Example 6

Figure 45:
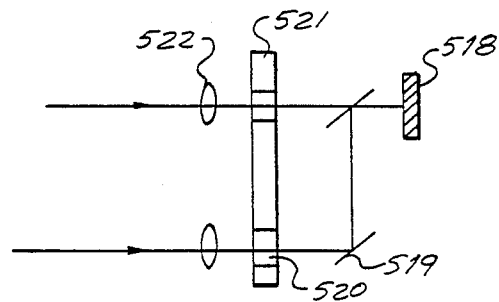

FIG. 45 shows a liquid crystal optical device 521 according to the present invention which has two openings 520. Device 521 and a group of mirrors 519 are located in front of a television camera sensor 518. By switching mirrors 519 once every 40 m sec., three-dimensional television signals can be generated. Each opening 520 includes a lens 522.

Example 7

Figure 46:
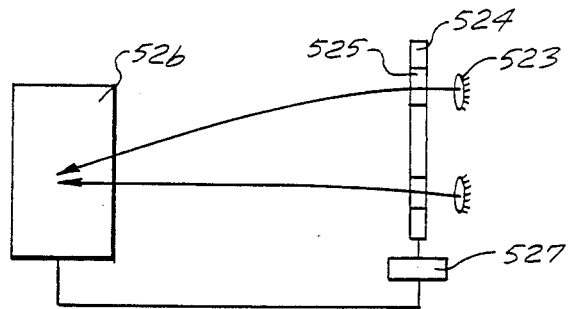

A liquid crystal optical device 524 of the present invention as shown in FIG. 46 has apertures 525 positioned to correspond to human eyes 523. By alternately opening and closing of apertures 525 in every 30 m sec. in synchronism with the switching signal in Example 5, a television image on a television receiver 526 receiving television signal in Example 5 can be seen three-dimensionally. Designated as 527 is a synchronous signal generator.

Example 8

Figure 47:
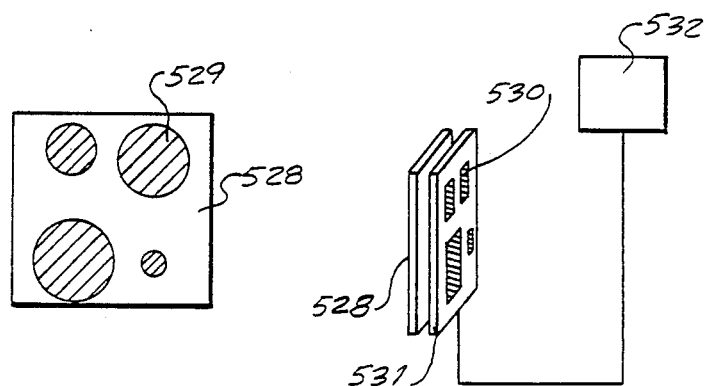

As illustrated in FIG. 47, a signal lens 528 has thereon a plurality of lens portions 529 having different focal lengths. A liquid crystal optical device 531 in accordance with the present invention has openings 530 corresponding to each of group of lens portions 529. There is thus provided an automatic focal length adjustment device which can select an appropriate focal length with a delay of 2 m sec. in response to a signal from an automatic focal point detector 532.

Example 9

Figure 48:
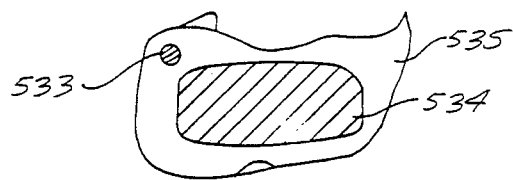

A pair of sunglasses having a photosensor 533 is constructed with a liquid crystal optical device 534 in accordance with the present invention as shown in FIG. 48. The sunglasses can protect the wearer's eyes with a shutter responsiveness of 1 m sec. Designated as 535 is a hood.

Example 10

Figure 49:
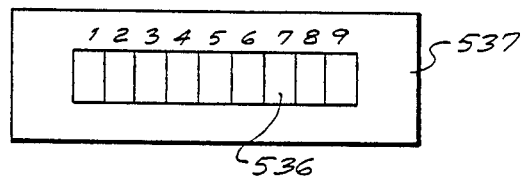

A liquid crystal optical device 537 in accordance with the invention includes a plurality of picture elements 536 arranged in a row is incorporated in a level meter as shown in FIG. 49. Such a level meter can perform switching in about 2 m sec. and give a sharply defined indication.

Example 11

Figure 50:
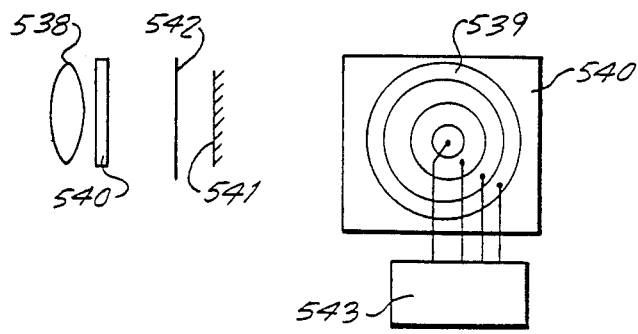

As shown in FIG. 50, a liquid crystal optical device 540 in accordance with the present invention has a plurality of concentric circular openings 539 disposed adjacent to a camera lens 538 and used as both a shutter and an aperture. The aperture thus constructed has an ON-OFF ratio of 1/2,000 and a minimum opening interval of time of 1 m sec. An auxiliary hood 542 is necessary since light tends to leak and fall on a film 541 even with the ON-OFF ratio of 1/2,00, since a hood may be opened and closed slowly in about one second.

As specifically described in the various foregoing embodiments, the present invention provides a liquid crystal optical device having a responsiveness characteristic which is several tens times faster than that of conventional liquid crystal devices, and hence the liquid crystal optical device of the present invention can find a variety of useful applications. The liquid crystal optical device according to the present invention is highly advantageous in that it is inexpensive to construct, has a large area, is characterized by low power consumption, is flexible in design to vary the shape of the opening, and features inherent in liquid crystal devices.

Advantages of a liquid crystal light valve according to the present invention have been described in terms of its responsive characteristic of light transmission. A light signal generator including a liquid crystal light valve will now be described with reference to a preferred embodiment of the present invention.

Figure 51B:
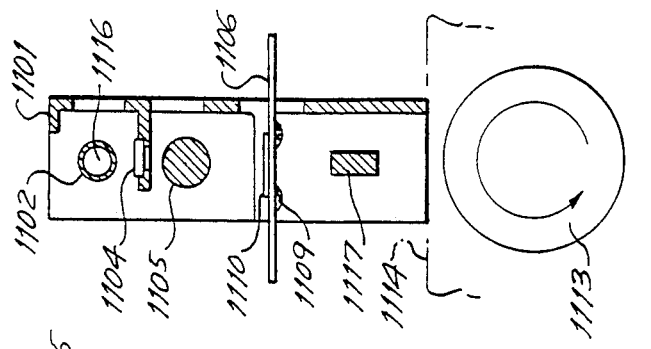
FIG. 51 shows a light signal generator according to an embodiment of the present invention, (a) being a front elevational view, (b) a side elevational view with parts in cross-section, and (c) a plan view.
Figure 51C:
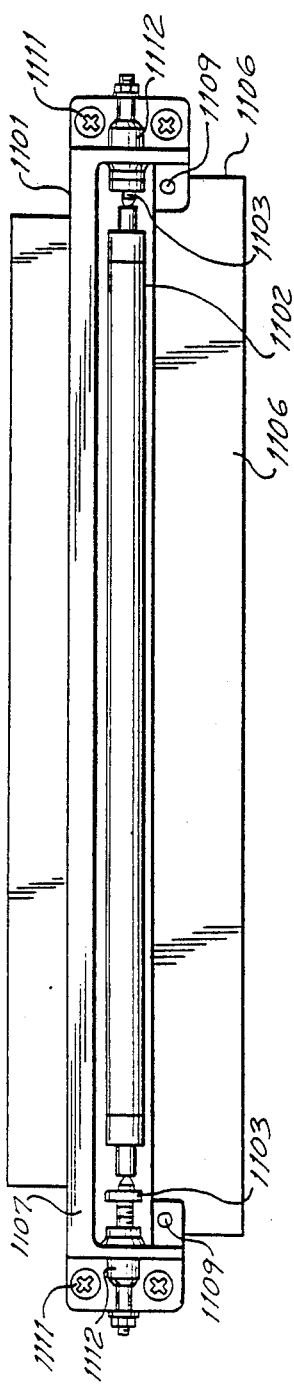
Figure 51A:
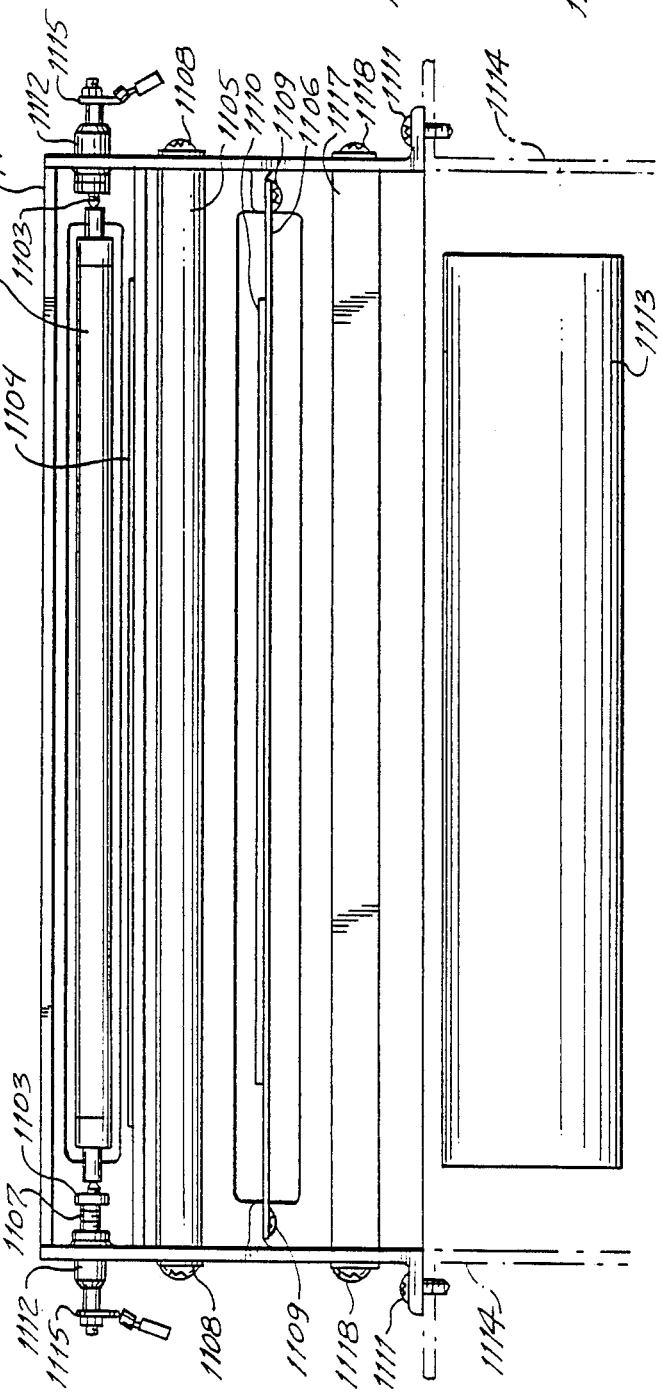

A printing device will be described in detail with reference to FIG. 51 of the drawings. FIG. 51 shows in (a) a front elevational view, in (b) a side elevational view with portions in cross-section, and in (c) a front elevational view. A casing 1101 houses the unit of the present invention which includes a halogen lamp 1102, electrical contact terminals 1103, a filter 1104 for absorbing infrared radiation, a rod lens 1105, a mounting plate 1106 for a liquid crystal lights valve, a spring 1107, screws 1108 for attaching a focusing lens, screws 1109 for attaching mounting plate 1106 for a liquid crystal light valve, a liquid crystal light valve unit 1110, screws 1111 for mounting unit casing 1101, a photosensitive drum 1113, a housing 1114 for a copying system, terminal plates 1115 for supplying halogen lamp 1102 with electrical power, a filament of the halogen lamp 1116, a gradient index fiber array lens 1117 and screws 1118 for attaching gradient index fiber array lens 1117. Light generated by halogen lamp filament 1116 illuminates liquid crystal light valve unit 1110 through rod lens 1105. Gradient index fiber array lens 1117 is arranged such that liquid crystal light valve 1110 and photosensitive drum 1113 are located at the conjugate lengths of gradient index fiber array lens 1117. The rod lens may be replaced with a gradient index fiber array lens, and both lenses may be replaced with rod lenses.

Although the source of light has been described to be a halogen lamp, it may be a fluorescent lamp, flash lamp, or the like. The source of light and lenses may be arranged in a variety of combination and should be positioned taking into account an overall design balance of the unit. A fluorescent lamp should be used if heat generated is likely to cause problems.

FIG. 52 is an exploded perspective view of the liquid crystal light valve unit, and FIG. 53 is a cross-sectional view of the unit. Light from the focusing lens enters a polarizer 1201, is transmitted through a B glass 1202 having common electrodes and a NESA film 1203 of $In_2O_3$ disposed thereon, and passes through slits or windows 1216 in a film 1204 of Cr and a film 1205 of Au on NESA film 1203. Slits 1216 have a dimension of about 40$\mu$. Light which has passed through slits 1216 reaches NESA film 1211 on $In_2O_3$ disposed on an A glass 1212. NESA films 1211 of $In_2O_3$ are patterned at intervals of 0.1 mm of A glass 1212. NESA films 1211 have a width of 80$\mu$ and are spaced at 20$\mu$. The patterned spacing is determined by the resolving power required of a printing system. It is possible to obtain a resolving power of 10 lines/mm for a printing system for producing high-quality prints. The higher the resolving power, the higher the cost. However, this may be accomplished without cost increase by using a liquid crytal-driven switching element. The opposite electrodes of the liquid crystal valve unit, namely, NESA film 1211 of $In_2O_3$ and NESA film 1203 of $In_2O_3$ on B glass 1202, cause the liquid crystal enclosed by a seal 1206 to change orientation during differing modes of operation. More specifically, the modes of operation of the liquid crystal are changed by the common electrodes, that is, NESA film 1203 of $In_2O_3$ on B glass 1202 and the electrodes, that is, NESA film 1211 of $In_2O_3$ patterned on A glass 1212, to allow or prevent passage of light through slits 1216. Polyimide resin is coated as an orienting material on NESA films 1203 and 1211 on A and B glasses 1212 and 1202, respectively, and is rubbed in different directions oriented at an angle of 90°. The layer of liquid crystal is approximately 6 $\mu$m. Light which has passed through NESA film 1211 passes through A glass 1212 and polarizer A 1213. The elements between polarizers 1201 and 1213 are fixed together by adhesive and vapor deposition and unitized as a whole on a plate of aluminum 1214. The electrodes are coupled to an IC block 1222 by a flexible substrate 1223 on a ceramic plate 1221 mounted on aluminum plate 1214. The electrodes comprise a layer 1210 of Cr deposited by vapor deposition on NESA film 1211 of $In_2O_3$, a film 1209 of Au deposited by vapor deposition on the film 1210, a film 1208 of Ni-P mounted on film 1209, and an uppermost film 1207 of Au-P. The flexible substrate 1223 is attached to a film of Zn mounted on film 1207 of Au-P.

Figure 54:
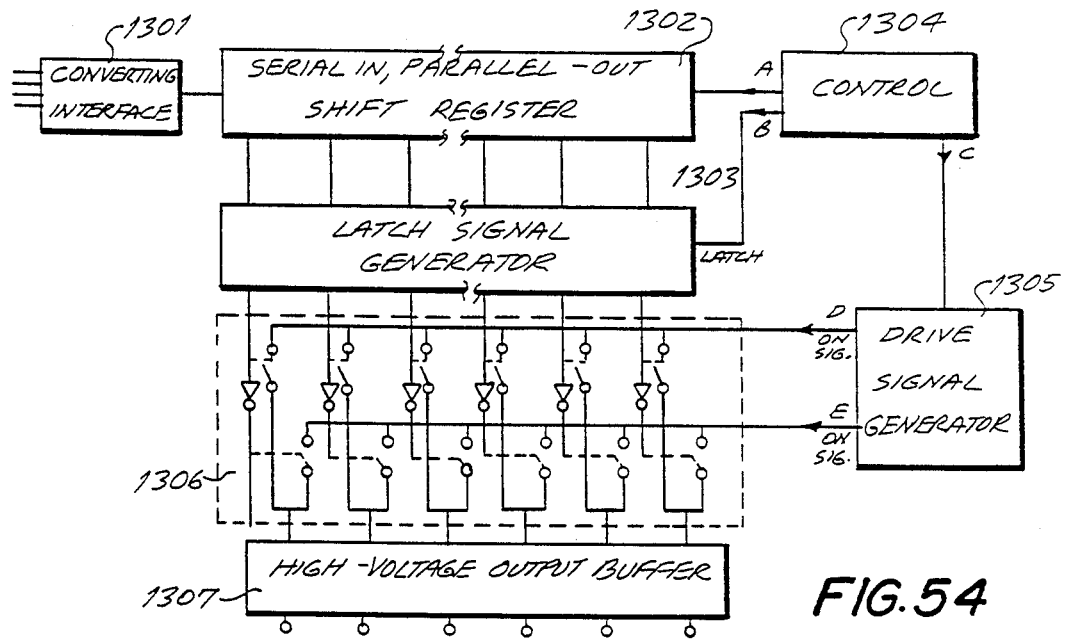
FIG. 54 is a block diagram of a drive circuit for the liquid crystal light valve of FIGS. 51 and 52.
Figure 55:
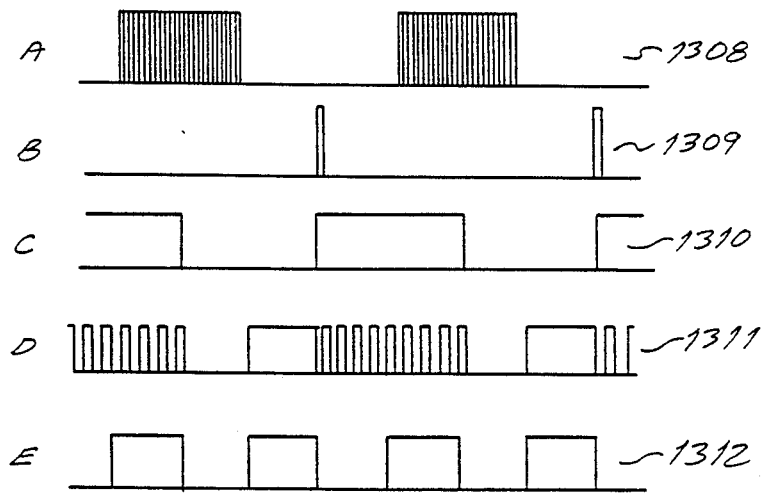
FIG. 55 shows waveforms of signals in the drive circuit of FIG. 53.
Figure 56:
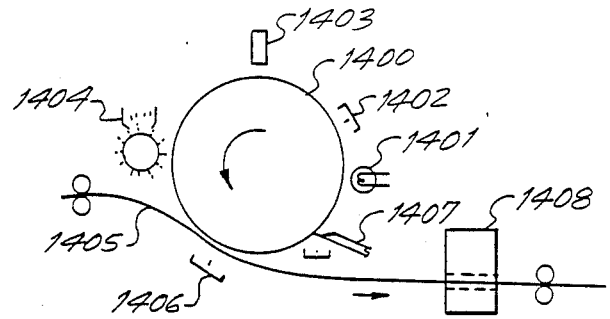
FIG. 56 illustrates an apparatus for the optical processing steps for forming a positive latent image in accordance with the present invention.

A process for generating signals for opening and closing the liquid crystal light valve as illustrated in FIGS. 52 and 53 will be descirbed. FIG. 54 shows in a block diagram a drive circuit for the liquid crystal light valve and in FIG. 55 the waveform of the signals. The liquid crystal drive circuit comprises an interface 1301 for converting print signals from an external source of signals into time-series picture element signals, a serial-in, parallel-out shift register 1302 corresponding to the number of picture elements per line, a latch signal generator 1303 for generating signals for latching the output from shift register 1302, a switch 1306 for switching drive signals, a buffer 1307 for producing outputs at a high potential, a drive signal generator 1305 and a control 1304.

A serial output for data per line from interface 1301 is read by shift register 1302 according to a train of clock pulses 1308 supplied from the control 1304. Then, the content in shift register 1302 is latched by a latch signal 1309 supplied also from the control 1304.

The drive signal generator 1305 produces an opening signal 1311 and a closing signal 1312 simultaneously as they are held in synchronism with the latch signal 1309 by control 1304. Drive signal switch 1306 serves to apply either drive signal 1311 or 1312 to high-voltage output buffer 1307 based on the output from latch signal generator 1303. A synchronous signal 1310 generated by the control 1304 keeps the drive signals synchronized. When signal 1310 is at a high level, a high-frequency portion of opening signal 1311 is generated. High-voltage output buffer 1307 serves to drive the liquid crystal cell.

The signal which is applied to the liquid light valve may be in any shape as long as it has the characteristics described above with reference to light transmission, signals 1311 and 1312 being shown by way of example. The signal applied to the liquid crystal light valve is a combination of a signal applied to the common electrodes and a signal applied to the signal electrodes. For example, no voltage may be applied to the common electrodes while a signal may be applied only to the signal electrodes. Alternatively, the liquid crystal light valve may be driven by a combination of a signal applied to the common electrodes and another signal applied to the signal electrodes. Thus, a light signal generator in accordance with an embodiment of the present invention may be provided as described above.

Various processes for forming images according to the present invention will not be described. A process for forming a positive latent image will first be described with reference to FIG. 56. Such a process comprises the steps of discharging an image remaining on a photosensitive drum 1400 rotating at a peripheral speed of 5 cm/sec. with a discharger 1401 comprising a lamp or an AC corona discharge, charging photosensitive drum 1400 with a corona charger 1402 (charger with a guard or a grid electrode being effective for uniform charging of the photosensitive drum), forming a latent image by eliminating latent image charges other than the area for an image to be formed with a light signal generator 1403, developing the image with toner at a developer 1404 of the magnetic roller or brush type, transferring the toner image, with a transfer discharger 1406 onto a recording paper 1405 travelling at a speed in synchronization with the peripheral speed of photosensitive drum 1400 and fixing the toner image to recording paper 1405 with light, heat, or pressure. Toner residuals remaining on photosensitive drum 1400 after the transferring step are removed by a blade 1407.

Figure 57:
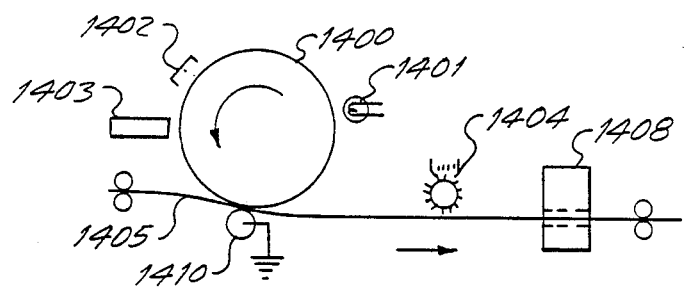
FIG. 57 illustrates an apparatus for forming an image on electrostatically charged recording paper as image in the process of FIG. 55.

FIG. 57 illustrates a process for forming an image based on the same principles as those of the process described above. Here, a latent image is transferred into electrostatically charged recording paper 1405 after the step of forming the latent image. Electrostatically charged recording paper 1405 is pressed against photosensitive drum 1400 by a backing electrode 1410 to effect latent image transfer due to contact or peeling. Thereafter, the image is developed by developer 1404 and then is fixed.

The above two embodiments are simpler than those which will be described below. Noises or image distortions tend to be generated depending on the diameter of a light spot while a latent image is formed. More specifically, when the light spot diameter is small, the ground gets dirty. When the ground dirt is completely removed, then a latent image spot becomes small, making the contour of the image thinner. Although the foregoing processes are sufficient for use in a plotter, they will produce images of poor quality and are not satisfactory for use in a printing device. To avoid such a problem, a process is preferable which causes an area illuminated by a light spot to form a charged latent image.

Figure 58:
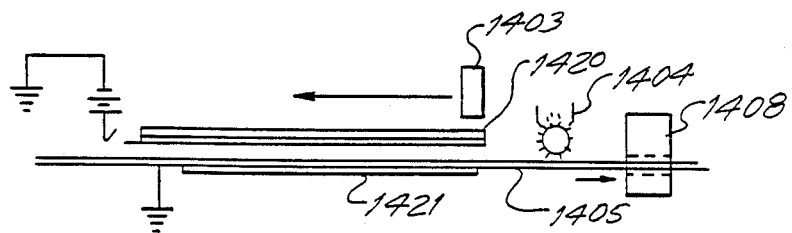
FIG. 58 illustrates an apparatus forming a charged latent image for the processes of FIGS. 55 and 56.

The process is illustrated in FIG. 58. A photosensitive body 1420 including a light-transmissive electrode and a photosensitive layer mounted on a light-transmissive base plate, and electrostatically charged recording paper 1405 held in contact with a backing electrode 1421 are biased as shown. After information has been optically written by liquid crystal shutter writing unit 1403, recording paper 1405 is peeled off on which a positive charged latent image is formed. Thereafter, the latent image is developed and fixed as in the above-mentioned processes.

Figure 59:
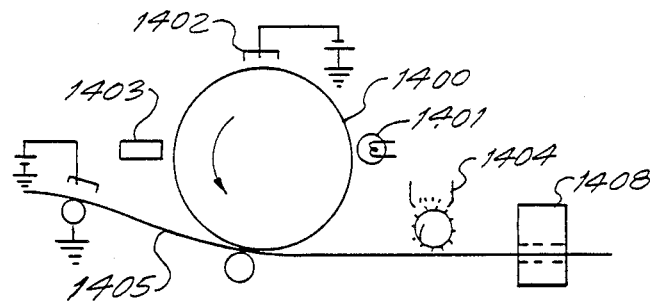
FIG. 59 illustrates an apparatus for positive developing a charged latent image on electrostatically charged recording paper.

FIG. 59 shows a process for positively developing a charged latent image on electrostatically charged recording paper 1405. Photosensitive drum 1400 has formed thereon a negative latent image as in the foregoing latent image forming processes, and electrostatic recording paper 1405 is charged in a polarity opposite to that of the charges on photosensitive drum 1400. Electrostatically charged recording paper 1405 is pressed against photosensitive drum 1400 by a transfer paper, whereby charges of opposite polarities on photosensitive drum 1400 and electrostatically charged recording paper 1400 are neutralized to allow a positive latent image to remain on electrostatic recording paper 1405. The image is developed and fixed as in the foregoing processes.

Figure 60:
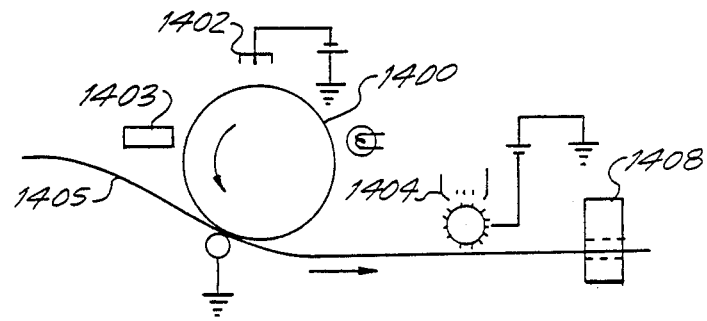
FIG. 60 illustrates an apparatus for reverse development of a negative latent image.

Finally, a process for reversably developing a negative latent image will be described with reference to FIG. 60. Here, a negative electrostatic latent image is formed on electrostatically charged recording paper 1405. To effect reverse development, magnetic roller developer 1404 is biased at the same potential and in the same polarity as the potential and polarity of the charged area on electrostatically charged recording paper 1405. As a result, toner is caused to adhere only to the non-charged area on electrostatically charged recording paper, to form a reverse image. The biased development may be effected by either a developer using toner of a single constitutent or a developer using toner of two constitutents. The image is then developed and fixed as in the above-mentioned processes.

As described above, various processes for forming images can be carried out using the light signal generator according to the present invention.

Example 12

Printing as described above was used to produce printed copies under the following conditions. A liquid crystal light valve was driven as a voltage V1 of 30 V at a temperature of 40° C. with fl of 1 KHz, fh of 100 KHz and T1 of 2 m sec. Minute shutter openings were in the form of a square dimensioned at 40 μm. A halogen lamp with a brightness of about 1,000,000 Cd/m² was used as a source of light, and zinc oxide sensitized with rose bengal was used as a photosensitive body. After information was written, toner was developed, transferred and fixed. Dots having a diameter of about 80 m were printed in a pattern according to printing signals. No irregular dots due to different signals and hence uniform dots were observed.

As described above, the present invention provides a printing device having a high-speed liquid crystal light valve, the printing device being small in size, highly reliable in operation and less costly to construct due to the features of the liquid crystal light valve. Thus, a high-speed printing device of a high quality which will be required by office automation in the future is available inexpensively.

It will thus be seen that the objects set forth above, and those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A printing device comprising light signal generator means including a source of light, liquid crystal light valve means in the path of light from the light source, driving circuit means for selectively driving the liquid crystal light valve means, photosensitive means for receiving light passing through the light valve means, developing means for developing an image formed by light striking the photosensitive means, and fixing means for fixing an image on the photosensitive means, the light valve means comprising a liquid crystal panel including two opposed transparent base plates, each base plate supporting at least one transparent electrode on the interior surface thereof so that the electrodes are in confronting relationship, a layer of opaque material deposited on at least one of the transparent electrodes facing the opposed base plate, the layer having a window opening for the passage of light, a layer of liquid crystal material enclosed between the base plates for controlling passage of light when the electrodes are driven.

2. The printing device of claim 1 in which there are a plurality of transparent electrodes disposed on each of the opposed transparent base plates and the opaque material is deposited on each of the transparent electrodes of one of the base plates to provide a plurality of windows.

3. The printing device of claim 1, wherein each of the transparent electrodes comprises a film of indium oxide.

4. The printing device of claim 1, wherein the opaque material comprises a film of chromium.

5. The printing device of claim 3, wherein the layer of opaque material comprises a film of chromium.

6. The printing device of claim 5, and further comprising:
a film of gold on each transparent electrode for making connection thereto.

7. A liquid crystal optical device comprising:
first and second opposed transparent base plate means;
transparent electrode means disposed on the interior surface of each of the base plate means and supported in confronting relationship thereby;
opaque means deposited on the surface of one of the electrode means and facing the opposed base plate means for preventing the transmission of light;
window means having an opening in the opaque means for passage of light; and
a layer of liquid crystal material enclosed between the base plate means for controlling the passage of light through the light valve in response to signals applied to the electrodes.

8. The liquid crystal optical device of claim 7, wherein there are a plurality of transparent electrodes disposed on each of the opposed transparent base plate means and the opaque means is deposited on the transparent electrode means of one of the base plate means to provide a plurality of window means.

9. The liquid crystal optical device of claim 7, wherein each of the transparent electrode means comprises a film of indium oxide.

10. The liquid crystal optical device of claim 7, wherein the opaque means comprises a film of chromium.

11. The liquid crystal optical device of claim 9, wherein the opaque means comprises a film of chromium.

12. The liquid crystal optical device of claim 7, and further comprising:
a film of gold on each transparent electrode for making connection thereto.

* * * * *